United States Patent
Gienger

(10) Patent No.: US 11,787,055 B2
(45) Date of Patent: *Oct. 17, 2023

(54) CONTROLLING A ROBOT USING PREDICTIVE DECISION MAKING

(71) Applicant: Honda Research Institute Europe GmbH, Offenbach/Main (DE)

(72) Inventor: Michael Gienger, Offenbach (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 260 days.

This patent is subject to a terminal disclaimer.

(21) Appl. No.: 17/216,709

(22) Filed: Mar. 30, 2021

(65) Prior Publication Data

US 2022/0314446 A1 Oct. 6, 2022

(51) Int. Cl.
B25J 9/16 (2006.01)

(52) U.S. Cl.
CPC ............ B25J 9/1666 (2013.01); B25J 9/163 (2013.01); B25J 9/1653 (2013.01); B25J 9/1664 (2013.01);

(Continued)

(58) Field of Classification Search
CPC ........ B25J 9/1666; B25J 9/163; B25J 9/1653; B25J 9/1664; B25J 9/1697; G05B 2219/39109; G05B 2219/40307
See application file for complete search history.

(56) References Cited

U.S. PATENT DOCUMENTS

| 9,724,826 | B1* | 8/2017 | Prats | B25J 9/1664 |
| 2005/0143860 | A1* | 6/2005 | Nakajima | B25J 9/1643 700/245 |

(Continued)

FOREIGN PATENT DOCUMENTS

EP 1728600 3/2008

OTHER PUBLICATIONS

Arbulu, M., et al., "Dynamic acyclic motion from a planar contact-stance to another", Sep. 2008, IEEE/RSJ International Conference on Intelligent Robots and Systems, pp. 3440-3445 (Year: 2008).*

(Continued)

*Primary Examiner* — Abby Y Lin
*Assistant Examiner* — Karston G. Evans
(74) *Attorney, Agent, or Firm* — JCIPRNET

(57) ABSTRACT

A method and system for controlling at least one effector trajectory for at least one effector of a robot for solving a predefined task are proposed. A graph of postures is acquired, and at least one of a contact constraint topology and an object constraint topology are accordingly modified. A set of constraint equations based on at least one of the modified contact constraint topology and the modified object constraint topology are generated. Constraint relaxation is performed on the generated set of constraint equations to generate a task description including the relaxed set of constraint equations. The effector trajectory is generated by applying a trajectory generation algorithm on the generated task description. An inverse kinematics algorithm is performed on the generated effector trajectory for generating a control signal, and the effector is controlled to execute the effector trajectory based on the generated control signal.

14 Claims, 8 Drawing Sheets

(52) U.S. Cl.
CPC ... *B25J 9/1697* (2013.01); *G05B 2219/39109* (2013.01); *G05B 2219/40307* (2013.01)

(56) References Cited

U.S. PATENT DOCUMENTS

| | | | | |
|---|---|---|---|---|
| 2015/0231786 | A1* | 8/2015 | Doi | B25J 9/1605 700/245 |
| 2017/0348856 | A1* | 12/2017 | Nakaya | B25J 9/1666 |
| 2018/0056512 | A1* | 3/2018 | Watts | B25J 9/1664 |
| 2021/0060779 | A1* | 3/2021 | Dupuis | B25J 9/1682 |
| 2022/0314437 | A1* | 10/2022 | Gienger | B25J 9/1607 |
| 2022/0314443 | A1* | 10/2022 | Gienger | B25J 9/1664 |

OTHER PUBLICATIONS

Adrien Escande et al., "Planning support contact-points for acyclic motions and experiments on HRP-2," Experimental Robotics, Jul. 2008, pp. 1-15.

Allison M. Okamura et al., "An overview of dexterous manipulation," Proceedings 2000 ICRA. Millennium Conference. IEEE International Conference on Robotics and Automation. Symposia Proceedings (Cat. No.00CH37065), vol. 1, Apr. 2000, pp. 1-8.

Michael Gienger et al., "Human-robot cooperative object manipulation with contact changes," 2018 IEEE/RSJ International Conference on Intelligent Robots and Systems (IROS), Oct. 2018, pp. 1-8.

Changhyun Sung et al., "Task-dependent distribution and constrained optimization of via-points for smooth robot motions," 2015 IEEE International Conference on Robotics and Automation (ICRA), Jun. 2015, pp. 1-8.

S. Chiaverini et al., "Review of the damped least-squares inverse kinematics with experiments on an industrial robot manipulator," IEEE Transactions on Control Systems Technology, vol. 2, Jul. 1994, pp. 1-13.

Michael Gienger et al., "Exploiting task intervals for whole body robot control," 2006 IEEE/RSJ International Conference on Intelligent Robots and Systems, Oct. 2006, pp. 1-7.

Hisashi Sugiura et al., "Real-time self collision avoidance for humanoids by means of nullspace criteria and task intervals," 2006 6th IEEE-RAS International Conference on Humanoid Robots, Jan. 2007, pp. 1-7.

Dmitry Berenson et al., "Pose-constrained whole-body planning using task space region chains," 2009 9th IEEE-RAS International Conference on Humanoid Robots, Dec. 2009, pp. 1-7.

Michael Gienger et al., "Task maps in humanoid robot manipulation," 2008 IEEE/RSJ International Conference on Intelligent Robots and Systems, Sep. 2008, pp. 1-7.

Alain Liegeois, "Automatic supervisory control of the configuration and behavior of multibody mechanisms," IEEE Transactions on Systems, Man, and Cybernetics, vol. 7, Dec. 1977, pp. 868-871.

* cited by examiner

FIG. 8B ⬇ CONNECT CONTACT

FIG. 8C ⬇ CONNECT CONTACT

CONTROLLING A ROBOT USING PREDICTIVE DECISION MAKING

TECHNICAL FIELD

The invention relates to the field of motion planning in robotics, in particular multi-contact motion planning methods and corresponding motion planning systems.

BACKGROUND

Multi-contact motion planning may be described as the problem of finding a contact sequence and a robot motion for performing movement tasks with changing contacts between a robot and physical structures in the environment. Movement tasks is interpreted in the present context as including walking gait patterns for mobile robots, referring to contacts between ground environment and movement means ("feet") of the robot.

An example are walking gait patterns. Walking gait patterns for mobile robots include a sequence of contacts between ground environment and movement means ("feet") of the mobile robot. For determining a walking gait pattern, a sequence of contacts between feet of the robot and the ground environment needs to be determined.

Another example is manipulation planning. For manipulating a physical object in the environment of the robot, a sequence of contacts of at least one end-effector ("manipulator", "hand", "finger") of the robot with the object has to be determined.

Determining solutions for problems of multi-contact motion planning requires ample computation resources. Determining solutions for problems of multi-contact motion planning requires even more resources in case a plurality of alternate possibilities (alternate movement options) for addressing a specific task exist.

Presently, there exists no optimal solution for addressing tasks in the field of multi-contact motion planning. A known strategy for addressing such tasks includes breaking down the task into subtasks, and subsequently solving each subtask separately. If a sub-task may be solved by different and alternately excluding solutions, each of the alternate solution may be examined and solved individually. Subsequently, the alternate options to address the task or subtask may be compared with each other and a solution is selected from the alternative options. However, this approach increases the computational requirements significantly.

The publication "Planning support contact-points for acyclic motions and experiments on HRP-2", by Adrien Escande, Abderahmane Kheddar, Sylvain Miossec, and Sylvain Garsault, in: Experimental Robotics. Springer, Berlin, Heidelberg, 2009, discloses an approach for contact before motion planning for humanoid robots that enables addressing the task of finding a path for a mobile robot in a constrained environment.

According to the known strategy for addressing such tasks, the problem of multi-contact motion planning may be divided into subtasks of
  searching for contact candidates (step 1);
    a geometric analysis of the operating space of the robot may be used for generating the contact candidates for a robot multi-contact locomotion task;
  searching a contact sequence from the contact candidates of step 1 and estimating corresponding contact poses (step 2);
    a potential-field based approach may be used to search for the sequence of contacts and for estimating the corresponding contact poses (robot poses);
  optimizing a trajectory between the contact poses of step 2 (step 3);
    the trajectory optimization connects the contacts of the contact sequence by connecting the corresponding contact poses of the robot.

Separating the problem into subtasks may results in a computationally more manageable problem. Nevertheless, a major drawback of this approach is the loss of the interdependencies between the individual computation steps: the search for the contact sequence and pose estimation of a subsequent second step base on the results of the preceding first step. Consequentially, in the second step, the contact candidates of the first step are not adapted in the second step. Similarly, optimal trajectories determined in a third step connect the contact poses estimated in the second step, and do only limited adaptation of locations of the contacts of the contact sequence, if any at all. Adapting of contact poses for a given contact between the third step and the second step are typically performed using techniques and algorithms known as Inverse Kinematics in the art.

Presently motion planning for sequential tasks is a challenging subject. One of the key aspects is to determine a feasible contact situation between the robot and the physical object and/or physical structures in the environment of the robot, so that successive steps in the sequence do not exceed physical limits of the robot. In many cases an interdependence between the successive steps of the sequence exists. For example, considering a sequence of poses, initially grasping a large object using a comfortable pose may result subsequently in inconvenient poses, for instance, when the task of moving the object and simultaneously turning the object while continuously maintaining contact between manipulators of the robot and the object is executed.

The problem of determining contact and object poses in a sequential task of multi-contact motion planning involving plural alternate options for proceeding addressing the task in an efficient manner while overcoming the problems discussed above needs addressing.

SUMMARY

A multi-contact motion planning method according to the first aspect, a non-transitory storage medium storing program instructions according to a second aspect and a corresponding motion planning system according to a third aspect address the problem.

A method for controlling at least one effector trajectory of an effector according to a first aspect starts with acquiring an (initial) graph of postures. The acquired graph of postures may solve a predefined task. Each posture of the sequence of postures includes at least one contact point and a kinematic pose of the at least one effector. At least one first posture and at least one second posture of the graph of postures are alternate postures. The method proceeds by modifying at least one of a contact constraint topology according to the acquired graph of postures and an object constraint topology according to the acquired graph of postures. The method then generates a set of constraint equations (model, kinematic model) based on at least one of the modified contact constraint topology and the modified object constraint topology. On the generated set of constraint equations, constraint relaxation is performed in order to generate a task description including a set of relaxed constraint equations. The method proceeds by generating the at least one effector trajectory by applying a trajectory generation algorithm on the generated task description. An inverse kinematics algorithm is then performed to generate a control signal from the at least one effector trajectory. The method proceeds by controlling the at least one effector based on the generated control signal to execute the at least on effector trajectory.

A non-transitory computer-readable storage medium according to a second aspect stores a program of machine-readable instructions executable by a digital processing apparatus to cause the digital processing apparatus to perform the method according to the first aspect.

A system (robotic system) for controlling at least one effector trajectory of a robot for solving a predefined task according to a third aspect comprises an acquisition unit configured to acquire a sequence of postures, wherein each posture includes at least one contact point and a kinematic pose of the at least one effector. At least one first posture and at least one second posture of the graph of postures are alternate postures. The system further comprises a processor configured to modify at least one of a contact constraint topology according to the acquired sequence of postures, and an object constraint topology according to the acquired sequence of postures. The processor is further configured to generate a set of constraint equations based on the at least one of the modified contact constraint topology and the modified object constraint topology, to perform constraint relaxation on the generated set of constraint equations to generate a task description including the relaxed set of constraint equations, to generate at least one effector trajectory by applying a trajectory generation algorithm on the set of constraint equations, to perform an inverse kinematics algorithm on the generated at least one effector trajectory for generating a control signal for controlling the at least one effector. The processor generates and outputs to the robot a control signal. The control signal is adapted to control the at least one effector to execute the generated at least one effector trajectory. The robot controls the at least one effector based on the control signal.

BRIEF DESCRIPTION OF THE DRAWINGS

Embodiments of the invention are explained in more detail with reference to the drawings.

FIG. 8B shows a sequence model of the manipulation scenario according to FIG. 4A comprising a sequence of postures without coupling of consecutive steps.

FIG. 8C shows a sequence model of the manipulation scenario according to FIG. 4A comprising a sequence of postures with coupling of fixed contacts of the consecutive steps.

Figure 1:
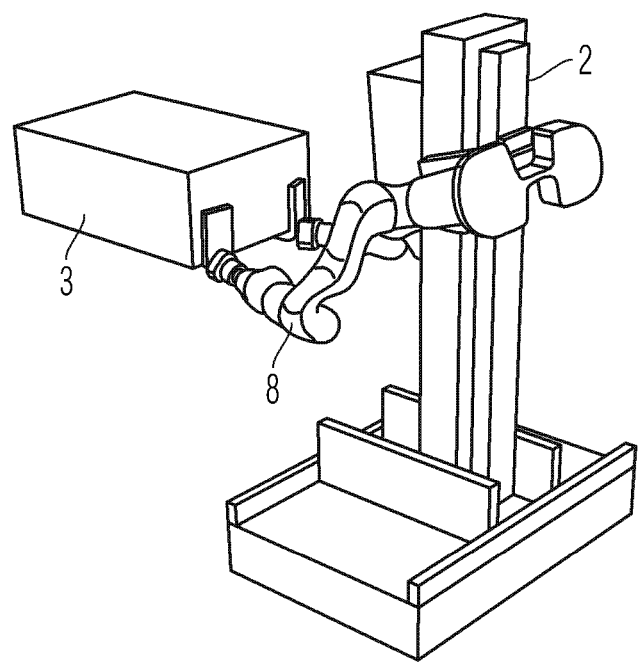
FIG. 1 illustrates a robot-object manipulation scenario in an exemplary application of an embodiment.

Same or corresponding features are denoted in the figures by same reference signs. The description uses terms known in the art of robotics. For convenience, some short references are provided before discussing examples of the invention in more detail with reference to the drawings.

DETAILED DESCRIPTION

The term "constraint" refers to a particular constraint condition in the sequence of postures. The sequence of postures is modelled as a multibody system. The constraint condition implies a restriction in the kinematic degrees of freedom of one or more bodies. The degrees of freedom denote the number of independent kinematic possibilities of moving. For example, degrees of freedom correspond to the minimum number of parameters required to define the position of the object in space. A body is a rigid or flexible part of a mechanical system, for example, the effector of robot. A link is the connection of two or more bodies, or a body with the ground. The link is defined by kinematical constraints that restrict the relative motion of the bodies. The constraint condition may be an algebraic equation that defines the relative translation or rotation between two bodies. In the particular case of the contact constraint, the relative translation is zero.

An original set of constraint equations comprises the contact constraint topology, the object constraint topology and task constraints. The generated set of constraint equations, which is generated based on at least one of the modified contact constraint topology and the modified object constraint topology and after performing constraint relaxation can have either have a same size as the original set of constraint equations, or a reduced size compared to the original set of constraint equations. The same size applies in a case, in which constraints of a current posture are changed to refer to the previous posture, but a dimension of the constraints is the same. The reduced size applies in a case, in which constraints of a current posture are removed during performing constraint relaxation.

The method is applied to a predefined task that has a graph structure, which therefore extends beyond a purely linear sequence of postures. The graph structure may for example include a plurality of postures in directed acyclic graph structure. This enables modelling several different option within the frame work of the method.

The method according to the first aspect determines robot-object or robot-environment contacts while simultaneously taking an overall sequence of postures (steps) into account. The method performs a computationally efficient contact pose adaptation for the overall contact sequence while regarding an overall optimality criterion. Comparing the method with the known approach discussed above, the approach adds an additional computation step, such that the method may be summarized as:
  contact before motion planning (step 1)
  searching a contact sequence and estimating corresponding contact pose (step 2)
  adapting sequence-optimal contact pose (step 2A)
  optimizing a trajectory between adapted contact poses (step 3).

The new step 2A allows to compute robot motions that will not be found using the state-of-the art approach that includes corresponding steps (step 1), (step 2), and (step 3). Consequentially, motions of the robot having a higher quality may be determined. Motions of a higher quality may include, for example, motions of effectors of the robot that show increased distance to joint range limits or reliably avoid collisions. The approach according to the method eases the use of a planning algorithm in step 1, since a user does not need to fine-tune a contact situation in more detail for motion planning. Further, the method may provide an optimized trajectory faster when compared with traditional trajectory optimization algorithms, in some cases even some orders of magnitudes faster.

Currently, there exists no concept to perform pose adaptation under consideration of an overall contact sequence.

In particular, the method enables a predictive decision making in a particular advantageous manner. Generally, sequences of postures may be one of different types. Different types of sequences include graphs of postures, for instance graphs of postures showing closed chains of posture sequences, or having directed acyclic graph structures. The method extends the sequence of postures to a graph of postures or a tree-like structure. Each branch of a tree represents an alternate option for proceeding from a decision point. The graph of postures separates at the decision point into separate branches, wherein each branch corresponds to one of a number of alternate options, how to progress in performing the task. When manipulating an object, an example of the decision point may include two alternatives in proceeding, either in a first option "turning the object left" or in a second option "turning the object right" when proceeding with the sequence of postures. The method allows without any extension modelling such graph topologies, which makes the method unique and advantageous with respect to known trajectory optimization algorithms. Potential applications include applying the method in online receding horizon motion planning. In online receding horizon motion planning as a particular example, a motion can be computed such that it is optimized with respect to the first option or the second option, or optimized with respect to a weighted average of all possible options at a same time. Thus, decision making between a first option and a second option may be based on computed criteria.

Provided that some measure describing which one of the alternate options is more likely is known, the options may be weighted according to their respective likelihood. If, for instance, in known cases, a left effector of the robot has been preferred over a right effector of the robot for grasping an object with a ratio of 80% to 20%, the known ratio may be used to modulate both options accordingly.

Using the same model, the sequence of postures may be computed using the first option only, and then second option only. Subsequently, the computed results may be compared, and a decision for one of the first and the second option can be taken based on a comparison of the cost functions for both options.

In case there exists a large number of possible alternate options, a weighting of the alternate options can be included into an optimization problem, providing solutions that are void of the options with the least quality, and maintain the options which are most promising.

The method enables determining a sequence of optimal robot contacts and object poses for tasks that comprise a sequence of object handling steps. The object may move between individual steps. The method determines sequences comprising object handling steps, which include decision steps for deciding between alternate options how to proceed in the sequence. These sequences including one or more decision steps may be formulated as graphs. The method enables adjusting object and contact constraints to optimize a global criteria function, while maintaining constraints consistent that do not change in the sequence at a consistent fixed pose. The scheme implemented by the method allows an implementation of a plurality of robot handling scenarios, ranging from assembly tasks to human-robot collaborative tasks.

Known methods such as trajectory optimization (TO) can only deal with linear sequences, and not with graph-structures that branch into different options. Furthermore, trajectory optimization requires more specifications for formulating the task: a trajectory representation, time-points, and other details such as criteria functions that determine a motion behavior when transitioning from one step to another step in the sequence of postures.

Contrary thereto, the proposed method is computationally more efficient and requires less specifications for describing the task. In addition, the method may be applied in a plurality of use cases that currently cannot be realized with trajectory optimization methods. For example, the method may be advantageously employed when considering several options for addressing the task, or in an interactive simulation how to approach the task.

The method is not limited to a particular contact sequence domain. The method may, for example, be applied to walking gait patterns of mobile robots, or to manipulation sequences and similar tasks in the field of robotics.

The method enables a predictive decision making in a particularly advantageous manner. A sequence of postures is extended to a graph of postures or a tree-like structure. Each branch of a graph represents an alternate option for proceeding from a decision point. The graph separates at the decision point into separate branches, wherein each branch corresponds to one of a number of alternate options. When manipulating an object, an example of the decision point may include two alternatives in proceeding, either in a first option "turning the object left" or in a second option "turning the object right" when proceeding with the sequence of postures. The method allows modelling such graph topologies or tree topologies without any extension, which makes the method unique and advantageous with respect to known trajectory optimization algorithms. Potential applications include applying the method in online receding horizon motion planning. In online receding horizon motion planning as a particular example, a motion can be computed such that it is optimized with respect to the first option or the second option, or a weighted average of all possible options at a same time. Thus, decision making between a first option and a second option may be based on computed criteria.

The graph structure may have, for instance, a tree structure (trees of postures), a closed chain structure, or a directed acyclic graph structure. A closed chain of postures is a graph structure in which a last posture of the sequence of postures connects to a first posture of the sequence of postures. The sequence of postures having a graph structure includes at least two individual postures, which the sequence arranges for execution at a corresponding point in time. The at least two individual postures, which the sequence arranges for execution at a corresponding point in time represent postures to be performed alternatively for performing the predefined task.

The method according to an advantageous embodiment comprises in the step of modifying the contact constraint topology, in case a contact location in the object frame of a current posture in the graph of postures remains the same as a contact location of the corresponding contact in an immediately preceding posture of the graph of postures, removing a constraint of the contact to the object in the current posture. In case a contact location in the object frame of a current posture in the graph of postures differs from a contact location of the corresponding contact in an immediately preceding posture of the graph of postures, the method proceeds by connecting a new constraint of the contact in the current posture to the corresponding contact in at least one immediately preceding posture of the graph of postures.

According to an embodiment of the method for controlling at least one effector trajectory, the step of modifying the object constraint topology comprises, in case an object pose of the current posture in the graph of postures remains the same as the object pose in an immediately preceding posture of the graph of postures, removing a constraint of the object in the current posture, and connecting a new constraint of the object in the current posture to the corresponding object in at least one immediately preceding posture of the graph of postures. For example, the step of removing a constraint of the object in the current posture removes a constraint with respect to a reference frame.

According to an embodiment of the method for controlling at least one effector trajectory, the step of performing constraint relaxation on the generated set of constraint equations comprises at least one of regularizing at least one individual constraint by allowing a deviation from the individual constraint, removing at least one constraint which is invariant for the task, and removing at least one constraint in case a value of the constraint coordinate is within a predetermined interval.

The method for controlling at least one effector trajectory may control the effector in real-time.

Alternatively or additionally, the method may be executed as part of an online receding-horizon planning method.

The method may generate the at least one effector trajectory as optimal with respect to one of the at least two alternate options. Alternatively, the method generates the effector trajectory as optimal with respect to a weighted average of the two alternate options.

The method for controlling at least one effector trajectory of an embodiment generates the at least one effector trajectory by applying a trajectory generation algorithm on the generated task description, including applying weights to the cost function for the at least one first posture and the at least one second posture. Weighting the cost functions corresponding to each branch enables to modulate its contribution to an overall cost function may be modulated and examined.

The method may apply a first weight to the cost function for the at least one first posture and at least one second weight is applied to the cost function for at least one second posture. This enables to compute the at least one effector trajectory as optimal with respect to one of the at least two alternate options, or to compute the at least one effector trajectory as optimal with respect to both of the at least two alternate options at the same time. For example, the method may compute the trajectory as optimal with respect to a weighted average of the two alternate options.

The first weight and at least one second weight may have a same value. Applying equal weights to both options will result in sequences of postures that are optimal with respect to both alternative options. This enables to decide with which option to proceed at the decision point as late as possible.

Alternatively, the method includes determining the first weight and the at least one second weight, and computes the first weight and at least one second weight to have a different value.

Alternatively, the method includes determining the first weight and the at least one second weight, according to a measure of likelihood whether selecting the first posture or the at least one second posture. Applying different weights to different options enables to simulate preferences, for example simulating a preference of grasping an object with a right hand over grasping with the left hand. The determined trajectory will then be optimized taking the assumed likelihood of how the decision will eventually be taken into account.

The method may further comprise a step of adjusting the effector trajectory of a robot to match a quality function. The quality function includes a description of a human ergonomic state determined based on a given ergonomic model of a human acting as a collaborative partner of the robot, and the adjusted effector trajectory defines an effector-and-object pose of the robot.

The method according to an embodiment comprises generating at least one first effector trajectory by applying a trajectory generation algorithm on the generated task description including the relaxed set of constraint equations including the at least one first posture. The method generates at least one second effector trajectory by applying a trajectory generation algorithm on the generated task description including the relaxed set of constraint equations including the at least one second posture separately from generating at least one first effector trajectory. The method proceeds by comparing a first cost function of the generated at least one first effector trajectory and a second cost function of the generated at least one second effector trajectory. Subsequently either the at least one first effector trajectory or the a at least one second effector trajectory are selected for generating a control signal based on a result of the comparison of the first cost function and the second cost function. This enables to decide between the at least two options at a decision point based on the better cost function.

In an embodiment, the acquired graph of postures, includes for the at least one first posture a plurality of second postures of the graph of postures as alternate postures. The method comprises determining the first weight and a plurality of second weights for the plurality of second postures in an optimization process, and the method proceeds by discarding at least one of the first posture and the second postures which has a least quality. If a large number of alternate options exists, the weighting of alternate options may be formulated as an optimization problem. This enables to determine those solutions for the effector trajectory and therefore for solving the predefined task, which are the options with a least quality. This may enables to identify a group of alternate solutions, which are void of the options with the least quality and only prosecute options further, which appear to have promising cost functions.

The method may include performing the method for solving a predetermined task with each of at least two different robots. The method then proceeds by performing a step of determining which of the at least two different robots is more suitable by comparing quality criteria for performing the task by each of the at least two different robots.

The method for controlling at least one effector trajectory may comprise performing constraint relaxation on the generated set of constraint equations, wherein at least a constraint equation on at least one location of a tool or object required for solving the task is relaxed. The method further comprises a step of determining at least one optimized location of the tool or object for designing a workplace within an environment for performing the predefined task.

The method for controlling at least one effector trajectory may comprise acquiring a plurality of graphs of postures for performing the predefined task, wherein individual graphs of postures of the acquired plurality of graphs of postures differ by the number of postures included in the respective graph of postures. The method performs the method for each individual graph of postures of the acquired plurality of graphs of postures, and discards individual graphs of postures, which result in a corresponding effector trajectory that violates at least one motion limit of the robot. In this example, the robot may belong to a specific class or type of robots characterized by their specific motion limit, for example the motion limit defines a specific range of an angle a joint of the effector of the robot may be able to reach.

The method for controlling at least one effector trajectory may be performed for controlling legs of a multi-legged mobile robot by optimizing leg effector trajectories of the legs to generate a multi-limb locomotion pattern of the multi-legged mobile robot.

The term configuration refers to a minimal coordinate representation of the kinematics of the robot and of the physical object for a single point in time.

The term posture refers to a particular kinematic arrangement of a set or a tree of rigid bodies according to a given configuration.

A sequence of postures a time-ordered sequence of configurations. A particular example of a sequence of postures is a graph of postures. Here a graph of postures denotes a sequence of postures which includes a least two postures, which are executed in parallel and mutually exclusive.

Degrees of freedom sometimes used in abbreviated form as dof, denotes actuated and non-actuated variables that constitute the movement possibilities of a kinematic model.

The configuration space is a vector comprising all degrees of freedom. The configuration space is typically denoted as vector q.

A pose is a spatial description of a rigid body with six degrees of freedom (position and orientation).

The approach of receding horizon control denotes a computational strategy to re-compute the solution to a task while a system is addressing the task.

The subsequent description of an advantageous embodiment initially describes the framework of the method based on the particular example of a linear sequence of postures as illustrated in FIGS. 8A to 8D and 10 in particular. The expansion to sequences of postures, which have a graph structure with at least two alternate postures will be discussed specifically with regard to FIG. 9.

FIG. 1 illustrates a robot-object manipulation scenario in an exemplary application of an embodiment. FIG. 1 depicts a bi-manual robot 2, which manipulates a (physical) object 3 using two effectors 8 to perform a predefined task, for example sorting and building stacks of objects 3 in an environment of the robot 2.

Figure 2:
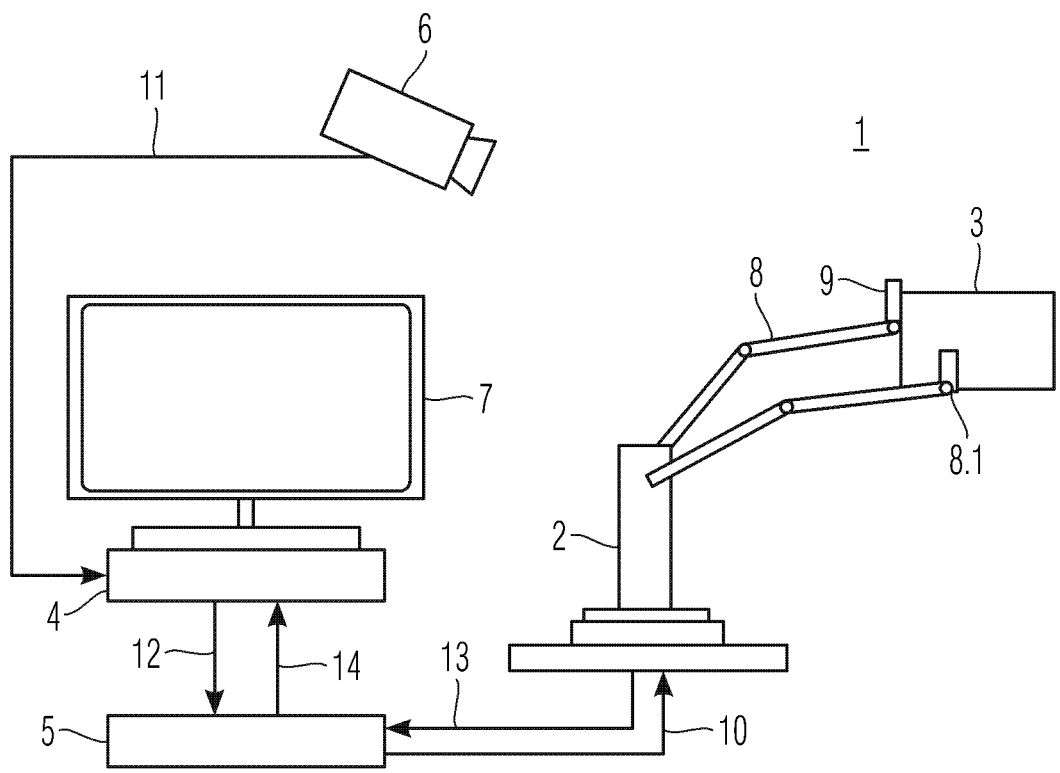
FIG. 2 provides an overview of a robotic system and its main structural elements according to an embodiment.

FIG. 2 provides an overview of a robotic system 1 and its structural elements according to an embodiment.

The predefined task achieves a movement of one or several objects 3 in an environment of a robot 2. The at least one object 3 is manipulated with one or several end-effectors 9 (manipulators) of the robot 2 or human hands. The embodiment addresses in particular the problem of finding contact locations and object poses within the sequence of steps for performing the predefined task. The embodiment bases on the concept of dexterous manipulation, which uses an object-centered description. Okamura, Allison M., Niels Smaby, and Mark R. Cutkosky provide in "An overview of dexterous manipulation" in: Proceedings 2000 ICRA. Millennium Conference. IEEE International Conference on Robotics and Automation. Symposia Proceedings (Cat. No. 00CH37065). Vol. 1. IEEE, 2000, a description of this concept, in which multiple effectors 8 of the robot 2 cooperate in order to address the task of grasping objects 3 and manipulating objects 3.

The method relies on rigid body kinematics and is suited to redundant robotic systems 1, which in present context means kinematic models which have more degrees of freedom than kinematic constraints.

An initial sequence of postures for addressing a task has already been computed using a generally known methods, e.g. with one of known state-of-the-art approaches. For example, a motion planning algorithm decomposes the task into a sequence of steps. For example, the publication "Planning support contact-points for acyclic motions and experiments on HRP-2", by Adrien Escande, Abderahmane Kheddar, Sylvain Miossec, and Sylvain Garsault, in: Experimental Robotics. Springer, Berlin, Heidelberg, 2009, discloses an approach for contact-before-motion planning for humanoid robots that enables addressing the task of finding a path for a mobile robot in a constrained environment. The initial sequence of postures for addressing a task may be obtained using an A*-search algorithm as discussed in more detail by Gienger, Michael, et al. in "Human-robot cooperative object manipulation with contact changes" 2018 IEEE/RSJ International Conference on Intelligent Robots and Systems (IROS), IEEE, 2018.

A set of constraints exists for each step within the sequence of postures. The set of constraints may include, e.g., contact locations and desired motion directions of the at least one object.

A contact refers to a match (spatial correspondence) between one point and coordinate frame of a body of the robot 2 on the one hand with one point and coordinate frame of the environment on the other hand, such that a distance between the body and the environment corresponds to (equals) 0. In the field of robotics, the term "coordinate frame" is often used in an abbreviated form as "frame".

Preferably, there is a description of invariance for at least one of the constraints. This means that that a constraint in the original pose can be modified by cancelling one or plural of the elements of the constraint without compromising the task. For example, an end-effector 9 of the robot 2 grasps a stick. In this example, there may exist constraint description describing the three-dimensional (3D-) description of the end-effector 9 of the robot 2 with respect to the stick. In this example an invariance in the description is the position along the stick, as the end-effector 9 may grasp the stick at any position along the length of the stick. A further description of invariance regards a rotation of the end-effector 9 around the circumference of the stick.

The robotic system 1 of FIG. 2 comprises the robot 2 (bi-manual robot) with two effectors 8, an object tracking device 6, e.g. a camera- or marker-based object tracking device, and data processing equipment, e.g. at least one computer 4, which is configured to run planning algorithms and motion generation algorithms. In particular, a program implementing the method for controlling at least one effector trajectory runs on the computer 4.

The computer may include at least one processor and at least one memory. For example comprising non-volatile and volatile memories for storing program instructions, and program data generated during execution of the method.

The robotic system 1 acquires a task description for the predefined task, for example via a user interface for receiving instructions to the robotic system 1. For example, the acquired task description (task) may instruct the robotic system 1 to put the object 3 on top of a pile of further objects 3.

The object tracking device 6 determines a current location of the object 3 in the environment. The object tracking device 6 generates a sensor signal 11 and provides the sensor signal 11 to the computer 4.

The computer 4 running a motion planning algorithm decomposes the acquired task into a sequence of steps. This may be done using an A*-search algorithm as discussed in more detail by Gienger, Michael, et al. in "Human-robot cooperative object manipulation with contact changes", 2018 IEEE/RSJ International Conference on Intelligent Robots and Systems (IROS), IEEE, 2018.

The robotic system 1 computes a posture of the robot 2 for each step of the sequence of steps and adds all computed postures into an overall kinematic model. The robotic system 1 analyses the sequence of postures for contact changes and object motions in each individual step with regard to an immediately preceding step of the sequence of postures. In particular, the robotic system 1 applies an algorithm "connect contacts" and an algorithm "connect objects" to the kinematic model. These algorithms will be discussed in detail with reference to FIGS. 6 and 7 below.

The computer 4 generates a model representing a task description for addressing the predefined task. The model includes in particular a set of constraint equations. The generated model is transformed into the inverse kinematics problem. The computer 4 solves the inverse kinematics problem applying an optimization algorithm of choice in order to perform an optimization process. The optimized constraints, e.g. effector poses and intermediate object poses when re-grasping the object 3, which are determined in the optimization process are passed to a trajectory generation algorithm running on the computer 4. The trajectory generation algorithm may be implemented as discussed in "Task-dependent distribution and constrained optimization of via-points for smooth robot motions" by Sung, Changhyun, et al., 2015 IEEE International Conference on Robotics and Automation (ICRA). IEEE, 2015.

The generated trajectories for end-effectors 9 are passed to an inverse kinematics algorithm that computes the corresponding robot postures, which are sent in a control signal 12 to a robot control unit 5. The robot control unit 5 of the robotic system 1 then controls actuators of the effectors 8 of the robot 2 using actuator control signals 10 generated based on the control signal 12.

Actuators of the robot 2 may include motors for moving the effectors 8 by controlling its joints 8.1, for example.

The robot 2 may generate a status signal 13 and output the status signal 13 to the robot control unit 5. The robot control unit 5 may provide the information contained in the status signal 13 along with further status information on the robot 2 to the computer 4 in a status signal 14.

The computer 4 may comprise input/output means, for example output means such as a monitor 7 for displaying image information to a user, and input means such as keyboard and a mouse device for receiving operation input from the user. The computer may in particular run software implementing a user interface, for example a GUI for interacting with the user.

Figure 3:
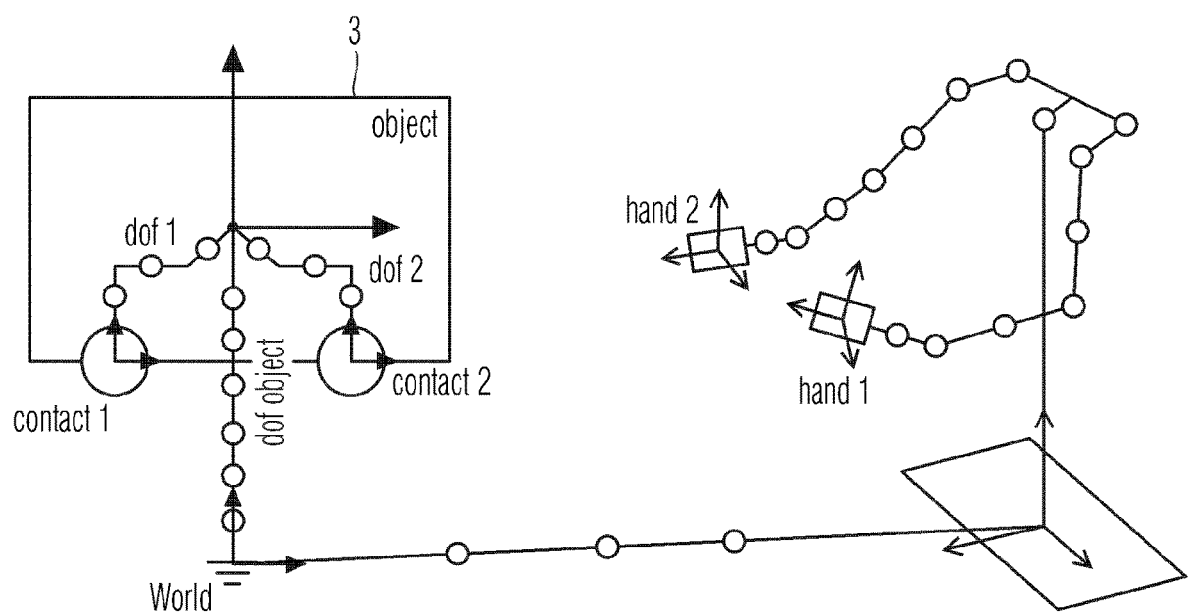
FIG. 3 illustrates an object-contact-model and a robot model for the robot-object manipulation scenario in the exemplary application of FIG. 1A.

FIG. 3 illustrates an object-contact-model for the robot-object manipulation scenario in the exemplary application of FIG. 1.

The object 3 is represented with respect to a reference frame by a coordinate chain dof_object. The inertial reference frame may also referenced as world frame. In FIG. 3, contact locations contact 1 and contact2 are represented in coordinates relative to the object 3, illustrated by the coordinate chains dof1 and dof2 in an object frame of the object 3. Dots on the lines connecting the object frame with the contacts contact1 and contact2 (contact points) represent the degrees of freedom that couple the contacts to the object 3. Different mathematic descriptions for this structure are used, e.g. a combination of a translation and a quaternion, or three translations followed by three elementary rotations.

For discussing the embodiment, it is not important how the degrees of freedom are modelled in detail. The description of the spatial contact movement (contact point movement) with respect to the object 3 is related to the known dexterous manipulation concept. The description of the contact movement according to the embodiment is not in relation to the reference frame.

FIG. 3 illustrates a robot model for the robot-object manipulation scenario in the exemplary application of FIG. 1, in particular the object-centred kinematic model. FIG. 3 illustrates the coupling to the object-contact model.

The kinematic topology of the robot 2 in FIG. 3 is not part of the object-contact model of FIG. 3. It is, however, part of the kinematic model of a time instance that combines both object 3, the contacts contact 1 and contact2, and the robot 2. Kinematic constraints between the effectors 8 of the robot 2 and locations of the contacts ensure that the effectors 8 of the robot 2 track the contacts of the robot 2 with the object 3.

The end-effectors 9 of the effectors 8 of the robot 2 depicted in FIG. 3 are hand1 and hand2. The contacts are contact1 and contact2. The corresponding kinematic constraints of the scenario in FIG. 3 are (hand1-contact1) and (hand2-contact2).

This modular separation of kinematic models allows to formulate the same predefined task with robots 2 having different kinematic structures. Thus the subsequent illustrations of the embodiment, in particular FIGS. 8A to 8D, is therefore able to omit the robot model according to FIG. 3 for a concise description.

Figure 4:
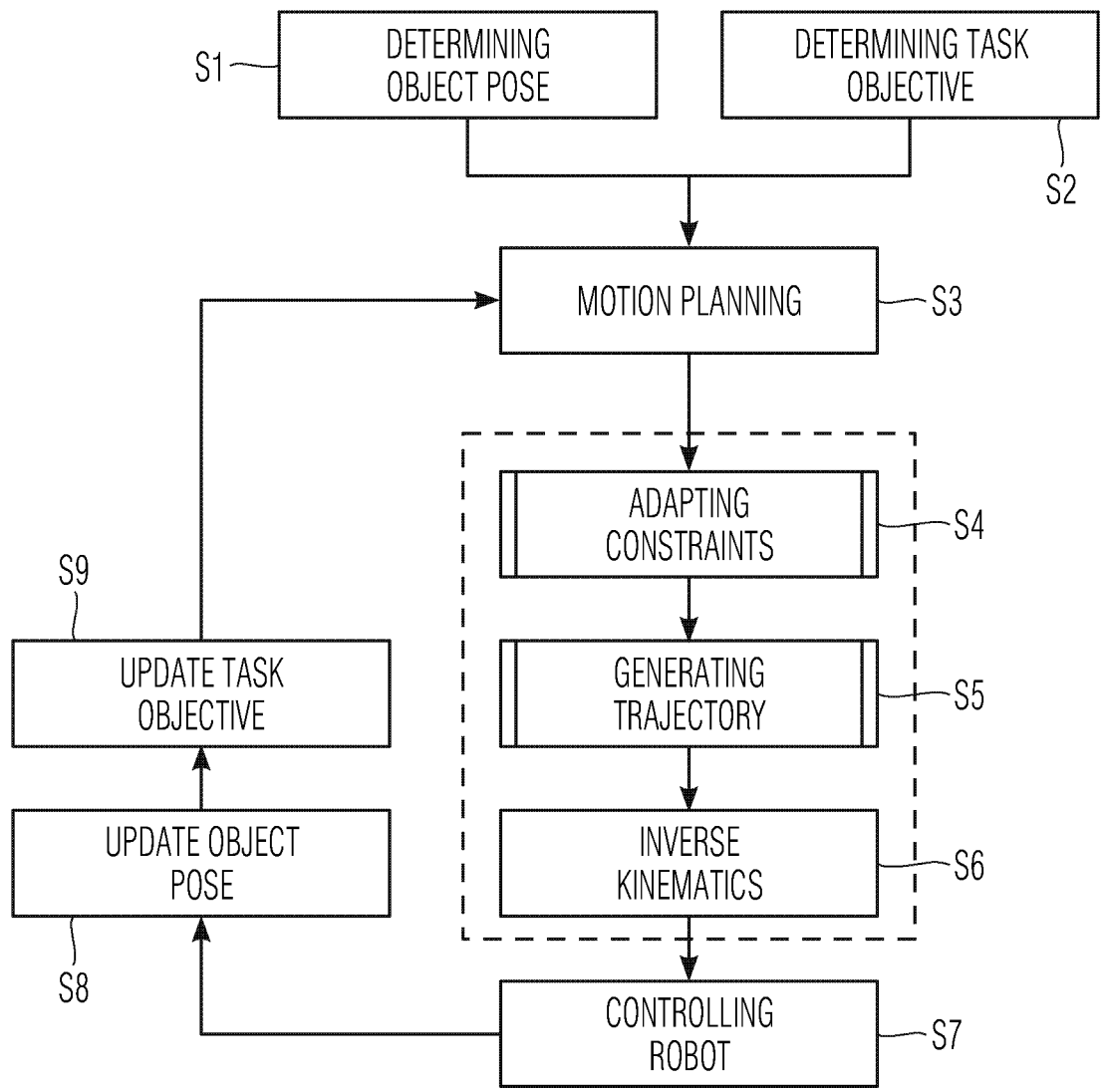
FIG. 4 depicts a method for controlling a robot applying an embodiment of the inventive method for motion planning in a flowchart.

FIG. 4 depicts the method for controlling a robot 2 applying an embodiment of the inventive method for motion planning in a simplified flowchart.

The method steps implement a process of manipulating the object 3 using two effectors 8 of the robot 2 of the robotic system 1. The displayed robotic system 1 comprises a bi-manual robot 2 that grasps and manipulates the physical object 3. The physical object 3 may be a tire or box. Alternatively, the method steps may implement a collaborative robotic system 1, which performs the predefined task in cooperation with a human also present in the same environment as the robot 2.

In step S1, the method determines an object pose. Step S1 in particular determines an initial object pose of the object 3. In step S1, the object tracking device 6 of the robotic system 1 may determine a location of the object 3 or locations of objects 3 as initial object pose within the environment (task environment) of the robotic system 1.

The method may execute step S2 of determining a task objective (task goal) in parallel or sequentially to step S1. For example, in step S2, the robotic system 1 may determine the task objective from an instruction provided externally, for example by a user via the GUI running on the computer 4 to the robotic system 1. The robotic system 1 may determine the particular task objective from a generic task.

One example of a generic task may include the instruction to sort objects 3 according to their size and arrange the objects 3 in stacks. The task objective may include grasping a specific object 3 and put the grasped object 3 in a specific orientation on top of a specific stack of objects 3. The specific stack is characterized by including objects 3 of a similar size.

The determined initial object pose and the determined task objective represent a task definition. The task definition is input to the step S3 of performing motion planning.

The task definition from steps S1 and S2 provides the basis for the step S3 of performing motion planning. In step S3, the robotic system 1 executes a motion planning algorithm on the task definition in order to generate a sequence of steps. The steps include a sequence of postures of the robotic system 1, in particular a sequence of postures of the effectors 8 of the robotic system 1 and a sequence of object poses to arrive at fulfilling the determined task objective, starting at the initial object pose. The motion planning algorithm applied in step S3 may be one of a plurality of known planning and motion generating algorithms available and discussed in literature in order to generate the sequence of postures provided by the step of motion planning. The robotic system 1 computes a posture of the robot 2, and in particular the effectors 8 of the robot 2 for each step of the sequence of postures. The computed postures are included in a kinematic model of the task.

One example for a motion planning system suited to perform step S3 is discussed in Gienger, Michael, et al.: "Human-robot cooperative object manipulation with contact changes", 2018 IEEE/RSJ International Conference on Intelligent Robots and Systems (IROS). IEEE, 2018.

The robotic system 1 subsequently uses the sequence of postures provided by step S3 of motion planning for performing constraint adaptation in step S4. The step of performing constraint adaptation in step S4 includes a sequence of sub-steps, which will be discussed in detail with reference to FIG. 6.

The step S4 in particular includes sub-step S4.2 of applying an algorithm for modifying a contact topology on the kinematic model. Furthermore, step S4 also includes sub-step S4.3 of applying an algorithm for modifying an object topology on the kinematic model.

Figure 6:
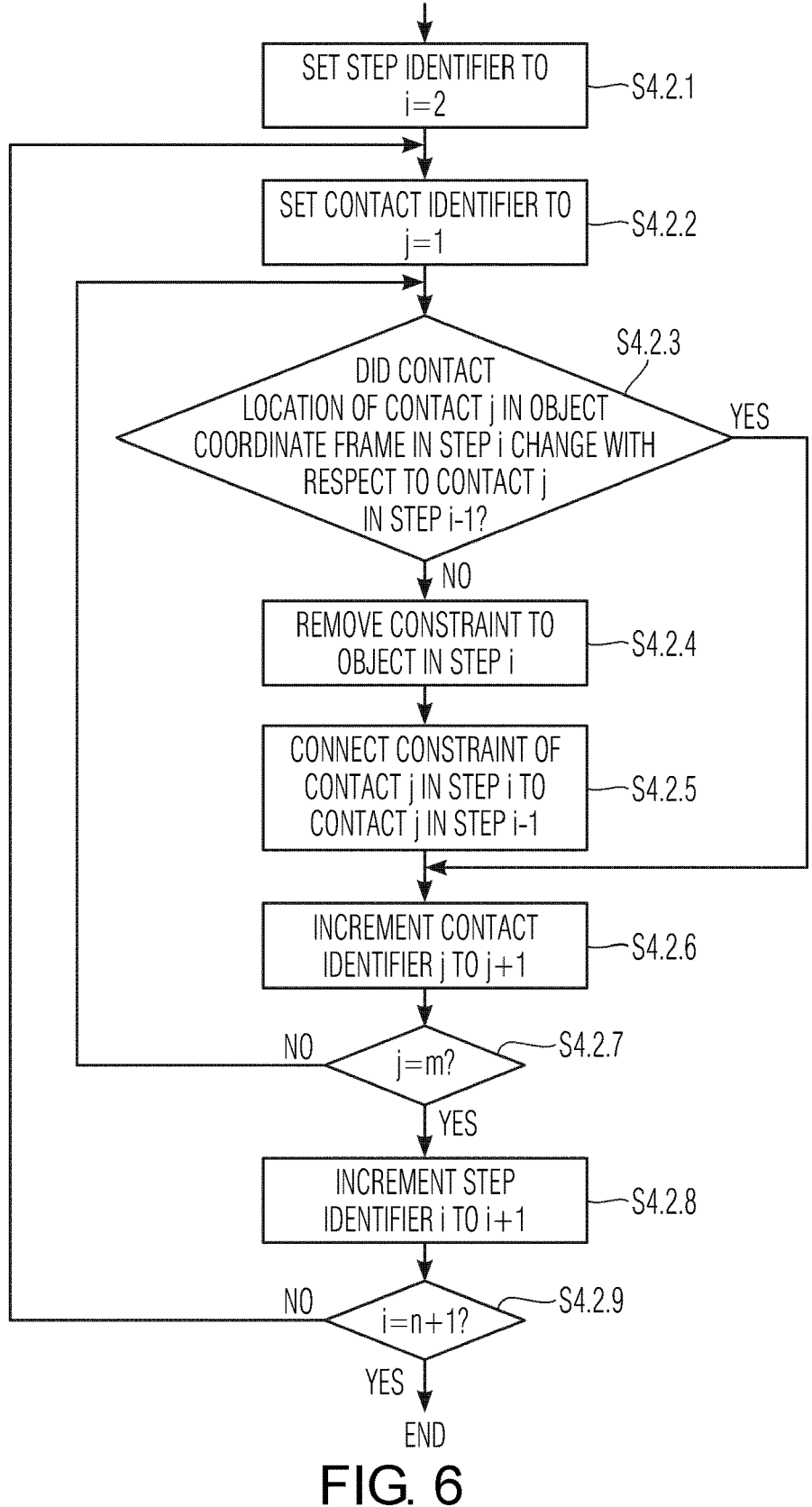
FIG. 6 depicts a flowchart for a process of connecting constraints across the sequence of postures in an implementation of the invention.

FIG. 6 discusses the algorithm for modifying a contact topology on the kinematic model according to step S4.2 in detail.

Figure 7:
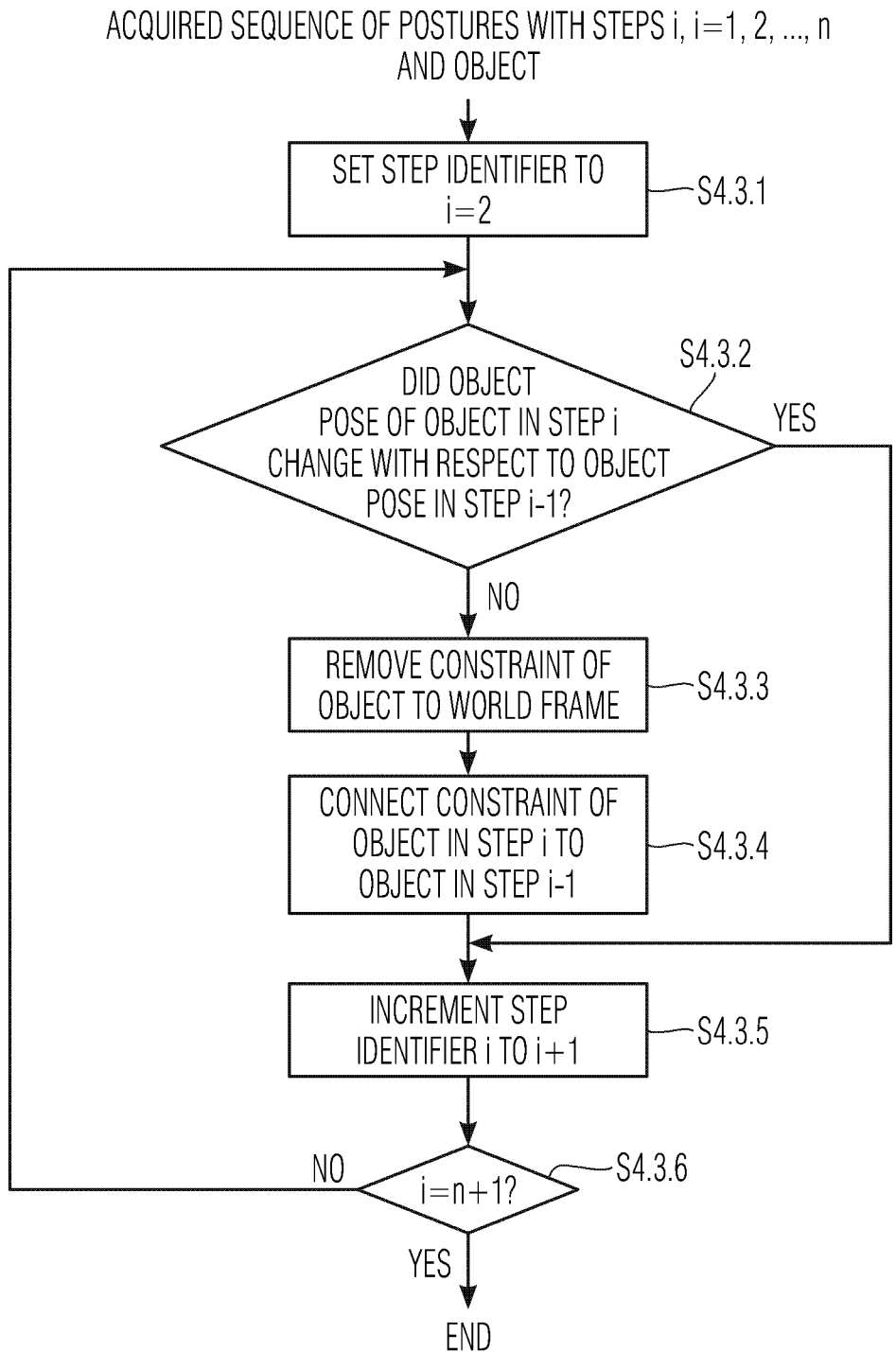
FIG. 7 depicts a flowchart for a process of connecting objects across the sequence of postures in an implementation of the invention.

FIG. 7 discusses the algorithm for modifying an object topology on the kinematic model according to step S4.3 in detail.

The contact and object constraints generated in step S4 form the basis for generating a task level trajectory therefrom in step S5. The contact and object constraints generated in step S4 may, for example, include effector poses and intermediate object poses when the effectors 8 a re-grasping the object 3.

The adapted contact and object constraints generated in step S4 provide the input to subsequent step S5, in which the adapted contact constraints and object constraints form the basis for generating the task level trajectory. Alternatively, step S5 may generate a plurality of task level trajectories. The step of generating the task level trajectory in step S5 includes a sequence of sub-steps, which will be discussed in detail with reference to FIG. 5.

Generating the task level trajectory in step S5 may be performed using one of a plurality of known trajectory generating algorithms which will be discussed with respect to FIG. 5.

The task-level trajectory generated in step S5 is then transformed into the inverse kinematics problem and the inverse kinematics problem is subsequently solved using an optimization algorithm in step S6. In particular, Step S6 computes corresponding robot postures for implementing the task level trajectory. The computed robot postures may include sequences of joint angles, which the individual joints 8.1 of the effectors 8 have to realize for achieving the task objective.

The output of step S6 represents a task description for achieving the task objective by the robotic system 1. Step S7 uses the generated task description from previous step S6 to control the robot 2 in order to achieve the task objective.

The embodiment depicted in FIG. 4 implements a robotic system 1 configured to perform online adaptation. In step S8, an update of the object pose is performed. The robotic system may perform updating the object pose based on at least one of the sensor signal 11 and the status signal 13.

Additionally or alternatively, in step S9, the task objective is updated. FIG. 4 depicts steps S8 and S9 being sequentially performed, the steps may alternatively be performed at least partially concurrently.

The object tracking device 6 of the robotic system 1 may acquire sensor data for updating the object pose and the task objective. The updated task objective and the updated object pose are then used to update the task definition and to perform motion planning according to step S3 using the updated task definition. Thus, the closed loop of the flowchart of FIG. 4 implements an online adaptation system. The online adaptation structure with steps S3-S4-S5-S6-S7-S8-S9-S3 according to FIG. 4 is a particularly advantageous structure for performing tasks in collaboration with a human, as the task definition may change due to unpredicted actions of the collaborating human or new instructions provided by the collaborating human.

Figure 5:
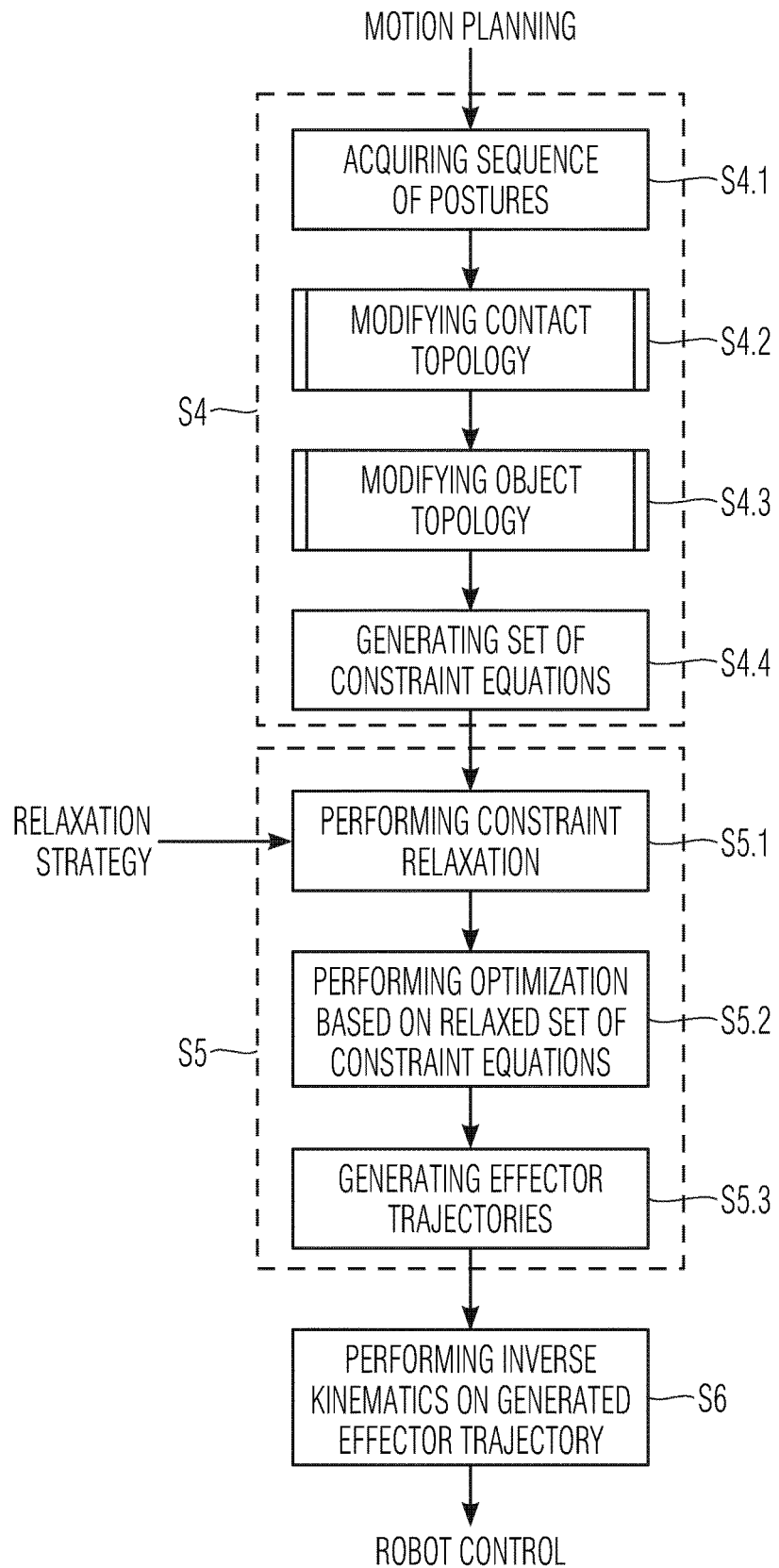
FIG. 5 illustrates the method for controlling an effector trajectory of a robot according to an embodiment in a flowchart.

FIG. 5 illustrates steps S4 and S5 of the method for controlling a trajectory according to an embodiment in a flowchart in more detail.

In step S4.1, the robotic system 1 acquires the sequence of postures generated by a motion planning algorithm in step S3 as an initial sequence of postures. Step S4.1 is the first sub-step for performing constraint adaptation in step S4. The acquired sequence of postures is then input to step S4.2, in which an algorithm for modifying a contact topology on the kinematic model is applied in order to generate a modified contact topology of the kinematic model. FIG. 5 illustrates the algorithm for modifying a contact topology on the kinematic model according to step S4.2 in detail.

The method proceeds to step S4.3 of applying an algorithm for modifying an object topology of the kinematic model to generate a modified object topology of the kinematic model. FIG. 7 illustrates the algorithm for modifying an object topology on the kinematic model according to step S4.3 in detail.

The modified kinematic model with the modified contact topology according to step S4.2 and the modified object topology according to step S4.3 are subsequently used for generating a set of constraint equations in step S4.4 based on the modified kinematic model.

The step S4.4 of generating the constraint equations may be performed according to generally known processes discussed in the literature in the field of robotics. In the following, two exemplary and alternative approaches for implementing step S4.4 are summarily discussed: a first approach corresponds to a task level constraint formulation. A second approach is a kinematic joint coupling formulation.

The first approach based on the task-level constraint formulation uses task-level constraints, which are included in a constraint vector δx and have a corresponding constraint Jacobian matrix $J_c$. Initially, a kinematic model is generated that comprises all steps of the sequence of postures. For a sequence of postures comprising n individual postures (steps), the corresponding kinematic model comprises $$n \times dof\_i; \quad (1)$$

degrees of freedom. In expression (1), dof_i denotes the number of degrees of freedom of an individual step of the sequence of steps. Furthermore, a constraint vector includes all kinematic constraint equations of the entire sequence of postures. The kinematic constraint equations describe the contacts and the object movements in the sequence of postures. Thus, the kinematic constraint equations include the information generated by performing the processes "connect contacts" in step S4.2 of modifying a contact constraint topology and "connect objects" in step S4.1 of modifying the object topology in the preceding steps of the method. Examples for the algorithms are explained as the algorithm "connect contacts" depicted in the flowchart of FIG. 6 and as the algorithm "connect objects" in the flowchart according to FIG. 7.

Mathematically, a formulation of the problem according to the task-level constraint formulation may read:

$$\begin{pmatrix} J_T \\ J_C \end{pmatrix} \delta q = \begin{pmatrix} \delta x_T \\ \delta x_c \end{pmatrix}; \quad (2)$$

In equation (2), the term $J_T$ comprises all task objectives that are not part of the contact constraints and object motion constraints, e.g. a desired movement of the object or a desired movement of effectors 8, or a movement of a motor-driven camera. Matrix $J_c$ is the constraint Jacobian matrix that is assembled with the sequence of postures and the object movement constraints. The vector δq comprises a displacement of the degrees of freedom q of the entire kinematic model including all steps of the sequence of postures. The vector $\delta x_T$ comprises the desired displacements for all task objectives that are not part of the contact constraints and object motion constraints. The term $\delta x_c$ comprises all constraint displacements. The constraint displacements $\delta x_c$ are typically zero. Alternatively, the constraint displacements may selected to ensure that the constraints lie on a desired location.

Thus, a kinematic model including all steps of the sequence of postures is generated. The kinematic model comprises all constraint equations within one holistic linear equation system according to equation (2).

This is a conventional way to formulate such constraints. The number of all task-level constraints corresponds to the dimension n of the vector $\delta x = (\delta x_T^T \ \delta x_c^T)^T$. This requires solving the linear equation system (2), which has an order $O(n^3)$ with n denoting the number of constraint equations. It is noted, that, in terms of computation time, this formulation scales sufficiently well for a small number of constraints.

The second approach of the kinematic joint coupling formulation provides an approach whose modelling proves advantageous in terms of scalability of the computational effort required for a large number of constraints. The basic concept of kinematic joint coupling is to directly couple the constraints on the level of the degrees of freedom. It uses constraint projection techniques that are also applied in multibody dynamics computations. Essentially, a set of degrees of freedom that is coupled kinematically is subsumed in one virtual degree of freedom. Formally, this can be expressed as $$J^*_C = JA; \quad (3)$$

Equation (3) describes a projection of degrees of freedom on a virtual degree of freedom. Matrix A is a projection matrix, which projects the coupled degrees of freedom q onto the virtual degrees of freedom q*. Thus, equation (2) may be rewritten using equation (3) as $$J^*_C \delta q^* = \delta x; \quad (4)$$

Equation (4) describes a virtual-degree of freedom based constraint formulation. This constraint formulation has the advantage that the explicit constraint displacements $\delta x_c$ of equation (2) are not included. A dimension of the virtual degrees of freedom δq* is less than a dimension of the degrees of freedom δq. The reduction in dimension improves the scalability of solving the resulting linear equation system significantly.

Figure 8A:
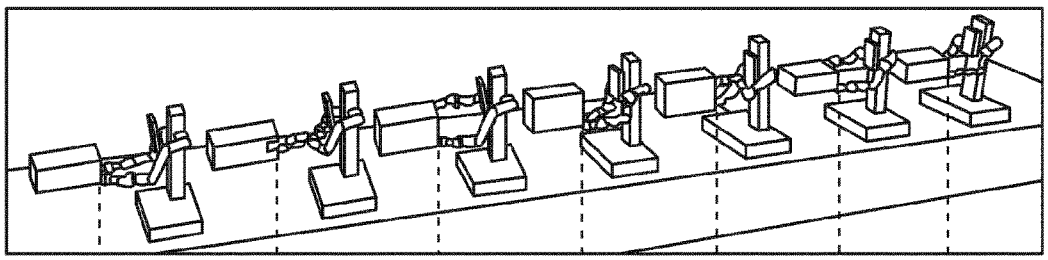
FIG. 8A illustrates a robot-object manipulation scenario including a sequence of steps in an exemplary application of an embodiment.

Applying kinematic joint coupling formulation according to the second approach on the exemplary sequence of postures illustrated in FIG. 8A shows that the problem can be solved five times faster than when using the first approach of task-level constraint formulation.

Returning to the flowchart of FIG. 5, the step S5 of generating a trajectory is discussed in more detail using FIG. 5, in particular its lower portion.

The generated set of constraint equations from step S4 and sub-step S4.4 is subsequently used for sub-steps S5.1, S5.2 and S5.3 according to the embodiment of FIG. 5. Step S5, generates a trajectory, in particular an effector trajectory or effector trajectories. In step S5.1, a constraint relaxation is performed on the generated set of constraint equations from step S4, resp. sub-step S4.4. Step S5.1 may perform the constraint relaxation based on a relaxation strategy on the constrained contacts and the constrained objects, which model the interdependencies of motions of the object 3 and the contacts contact1, contact2 between the individual steps of the sequence of postures. The constraint relaxation of step S5.1 enables to efficiently utilise the concepts of the process of constraining the contact topology according to step S4.2 and constraining the object topology according to step S4.3.

The relaxation strategy is a strategy or a set of strategies, which changes mathematically strict constraints to relaxed constraints. Mathematically strict constraints are constraints, which ensure a precise constraint satisfaction. The relaxed constraints are constraints, which in comparison to the mathematically strict constraints before step S5.1 achieve the result that a Null space motion will be projected into relaxed constraint coordinates. Performing constraint relaxation may include in particular (1) allowing a deviation of the constraint instead of enforcing the originally strict constraint.

An example for the approach according to (1) for performing constraint relaxation is regularization of individual constraints within the inverse kinematics, such as the Damped Least Squares approach according to: "Review of the damped least-squares inverse kinematics with experiments on an industrial robot manipulator" by Chiaverini, Stefano, Bruno Siciliano, and Olav Egeland. In: IEEE Transactions on control systems technology 2.2 (1994): 123-134. A further approach for relaxing constraints in step S5.1 includes (2) removing constraint coordinates that are invariant for the task.

European patent EP 1 728 600 B1 discloses the approach according to (2) for controlling an effector trajectory from a current state to a target state whereby invariant control parameters are taken into account. Invariant control parameters are control parameters that are not required, but do not interfere to achieve the predefined task. This may correspond to an end effector rotation about a cylindrical object 3. The effector trajectory is then represented in a task description, the task description being void of the invariant control parameters. As the task description does not include the invariant control parameters, a dimension of the Null space is increased. Yet a further approach for relaxing constraints in step S5.1 includes (3) removing constraint coordinates that are within a predefined interval or region.

Particular examples for the approach according to (3) for relaxing constraints provide, for example, Gienger, Michael, Herbert JanBen, and Christian Goerick in "Exploiting task intervals for whole body robot control", 2006 IEEE/RSJ International Conference on Intelligent Robots and Systems. IEEE, 2006; Sugiura, Hisashi, et al. in "Real-time self collision avoidance for humanoids by means of nullspace criteria and task intervals", 2006, 6th IEEE-RAS International Conference on Humanoid Robots. IEEE, 2006; Berenson, Dmitry, et al. in: "Pose-constrained whole-body planning using task space region chains", 2009 9th IEEE-RAS International Conference on Humanoid Robots. IEEE, 2009, and Gienger, Michael, Marc Toussaint, and Christian Goerick. "Task maps in humanoid robot manipulation." 2008 IEEE/RSJ International Conference on Intelligent Robots and Systems. IEEE, 2008.

These exemplary relaxation strategies for performing constraint relaxation in step S5.1 achieve the effect that the Null space motion is projected into the relaxed constraint coordinates. Illustrative examples include

- a rotation of an effector-contacting surface about a contact normal vector,
- a displacement of contacts along an edge or a face of a geometric structure,
- an acceptable inclination of an effector contact with respect to the contacting surface, and
- an object 3 to be re-grasped at an arbitrary position or with an arbitrary pose.

Performing the constraint relaxation of step S5.1 leads to consistently adjusting the constraint coordinates so that a cost function H(q) will become optimal. This effect will be discussed with reference to an example shown in FIG. 8 below.

Step S5.1 generates a relaxed set of constraint equations by performing constraint relaxation. Step S5.2, succeeding to step S5.1, performs an optimization on the relaxed set of constraint equations based on a cost function In step S5.3, the optimization result of the relaxed set of constrain equations provides the basis to generate an effector trajectory therefrom. In particular, the relaxed set of constraint equations provides the basis to generate or to optimize the effector trajectory. The possibly optimized task level trajectory is provided to step S6 for performing inverse kinematics with the d task level trajectory as input to generate the control signal 12, and subsequently to controlling the robot 2 based on the corresponding control signal 12.

Solving the mathematical formulation of the posed problem modelled either by the task-level constraint formulation or the kinematic joint coupling may be performed in a corresponding manner. A motion of the degrees of freedom $\delta q$ or $\delta q^*$ is computed in step S5.3 using inverse kinematics performing a generally known approach. For example, publication "Automatic supervisory control of the configuration and behavior of multibody mechanisms" by Liegeois, Alain, in: IEEE transactions on systems, man, and cybernetics 7.12 (1977): 868-871 discusses a suitable approach in detail.

Alternatively, any other differential inverse kinematics algorithm with redundancy resolution may be used.

An aspect of the inverse kinematics calculation is the resulting Null space motion. A Null space motion typically exists when a model has more degrees of freedom than constraints. Such kinematic models are redundant models. In present context, it is assumed that the generated model is a redundant model. Redundancy resolution is a concept to project a scalar cost term H(q) into the Null space of the motion.

The Null space motion is the motion of the system that does not change any of the task-level constraints in $\delta x$.

The cost term H(q) is described in the configuration space q of the robot 2. The configuration space is the space of the controllable degrees of freedom of the robot 2. The configuration space may be composed of individual joints 8.1 of a robot 2 or more complex kinematic mechanisms to which controllable degrees of freedom can be assigned.

Typical examples for the cost term H(q) describe avoiding joint limits, or avoiding self-collisions with regard to the effectors 8 of the robot 2. The particular choice of the cost function H(q) as criterion is not important in present context. Computing the motion of the overall sequence of postures under consideration of all degrees of freedom q, all task-objectives and all constraints $\delta x$ and the cost function H(q) may be formulated as $$\delta q = J^*_c \delta x - N \, \mathrm{grad}(H(q))^T; \quad (5)$$

Equation (5) describes redundant differential inverse kinematics. Matrix $J_c^\#$ refers to the pseudo-inverse of the Jacobian matrix $J_c$. Matrix N is the corresponding Null space projection matrix. The gradient operator grad (.) in equation (5) defines the gradient of the cost term H(q) with respect to q.

The cost term H projection has an important role in present context, and had been discussed in the section with regard to step S5.1 of performing relaxation on the generated set of restraint equations, since it defines the gradient direction of the objective of H(q).

Equation (5) may be solved efficiently using known techniques in the field of linear algebra. For example, Cholesky decomposition or Singular Value decomposition perform well for solving problems such as equation (5).

FIG. 6 depicts a flowchart for the process of connecting contact constraints according to step S4.2 across the sequence of postures in an implementation of the invention.

FIG. 7 depicts a flowchart for a process of connecting objects across the sequence of postures in an implementation of the invention. The concept of the algorithm "connect object" underlying method step S4.3.

FIGS. 6 and 7 will be discussed in detail after presenting their generic concept using FIGS. 8A to 8D.

FIG. 8A illustrates a robot-object manipulation scenario including a sequence of steps in an exemplary application of an embodiment.

The depicted scenario considers a sequential task such as turning the object 3 upside-down. The scenario can be represented as a sequence of the above kinematic models. FIG. 8A shows seven individual postures ranging from step 1 to step 7 of the depicted sequence of postures where spatial changes of contacts and movements of the object 3 occur.

FIG. 8B shows a sequence model of the manipulation scenario according to FIG. 8A comprising the sequence of postures without coupling of consecutive steps.

FIG. 8B displays the corresponding kinematic model for the sequence of postures according to FIG. 8A. The kinematic chain of each contact is from "contact" via "object" to "reference frame". Therefore, each step from step 1 to step 7 has a corresponding posture that is independent of the posture of all other steps of the depicted sequence of postures.

A first process of the method is to modify a contact constraint topology according to the sequence of postures as shown in FIG. 8B. The result of performing the method to modify the contact constraint topology is depicted in FIG. 8C.

In FIG. 8B, from step 1 to step 2, the right contact does not change its location on the object 3, it remains fixed in the object coordinate frame. According to the process of modifying a contact constraint topology, the kinematic constraint of the right contact is amended to connect to the respective contact of the previous step. In FIG. 8C, an arrow connecting the right contact of step 2 with the corresponding right contact of step 1 is added. The kinematic chain of the right contact in step S2 is cancelled.

From step 2 to step 3, both contacts remain fixed in the object's coordinate frame. The object 3 is rotated from step 2 to step 3 in FIG. 8B. Therefore, both contacts of step 3 are connected to the corresponding contacts of step 2. The kinematic chains of the right contact and the left contact in step S3 are cancelled.

This strategy of modifying a contact constraints topology according to the sequence of postures as shown in FIG. 8B is performed until the end of the sequence, e.g. step S7 of the sequence of postures is reached. FIG. 8C shows the resulting sequence model with a modified contact constraint topology.

FIG. 8C shows the sequence model of the manipulation scenario according to FIG. 8A comprising a sequence of postures with a coupling of fixed contacts of respective consecutive steps of the sequence of postures.

While the embodiment discussed with reference to FIG. 8A to 8D, uses a bi-manual robot model for illustration, it is evident that the concept is applicable to any number of contacts, and also to scenarios involving more than one object 3.

Furthermore, the concept is also not limited to the effectors 8 of a robot 2 (robot arms). Anything that can be mathematically represented as a chain of rigid bodies (tree of rigid bodies) may be understood to be covered by the term "effector".

Furthermore, the concept is also not limited to effectors 8 of a stationary robot 2. The concept is also applicable for, e.g. mobile platforms, multi-legged robots 2 or bio-mechanical models of a human. In one particular application, the effectors 8 of a (mobile) robot 2 may correspond to means for moving the robot 2, such as legs (robot legs).

Figure 8D:
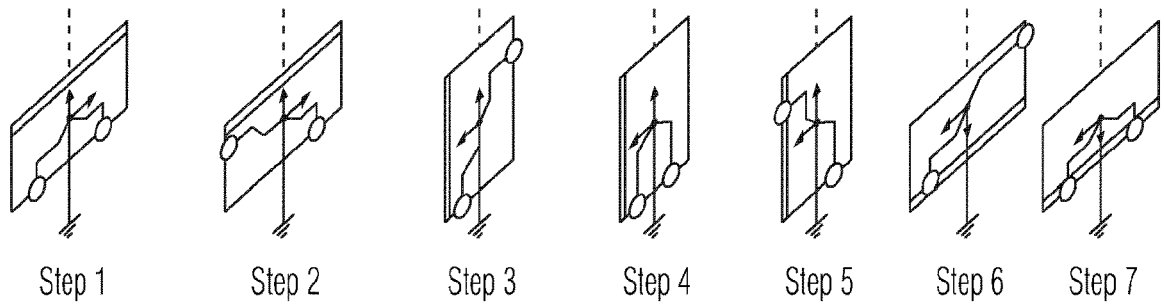
FIG. 8D shows a sequence model of the manipulation scenario according to FIG. 4A comprising a sequence of postures with coupling of fixed contacts of the consecutive steps and coupling of constant object poses.
Figure 8D:
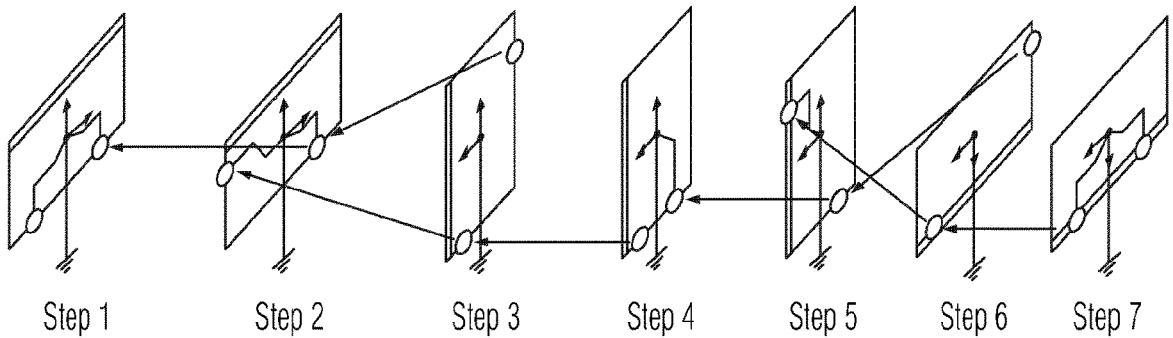
Figure 8D:
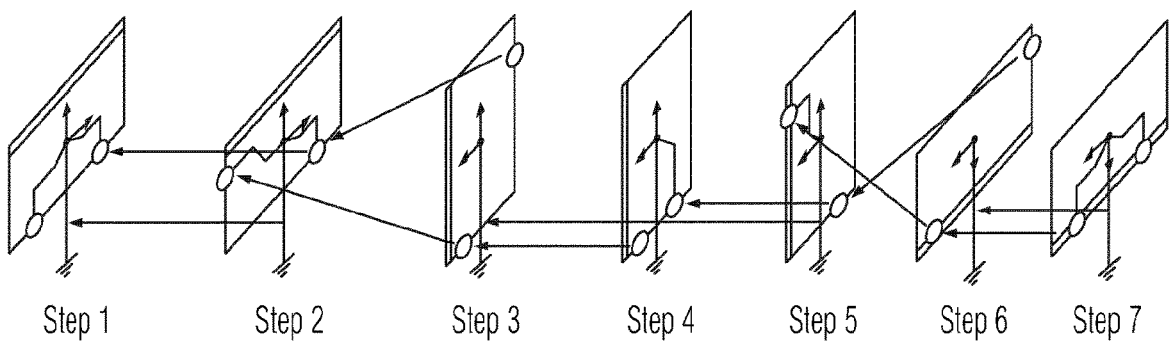

FIG. 8D shows a sequence model of the manipulation scenario according to FIG. 8A comprising a sequence of postures with a coupling of fixed contacts of the consecutive steps and a coupling of constant object poses between consecutive steps. FIG. 8D illustrates the sequence model of the manipulation scenario according to FIG. 8A based on modified constraint and object topology in the generated set of constraint equations. With regard to the sequence of postures with a coupling of fixed contacts of the consecutive steps reference to FIG. 8C and the corresponding section of the description is considered sufficient.

A second process of the method is to modify an object constraint topology according to the sequence of postures. This process may be performed independent of the first process.

Alternatively, the second process of the method of modifying an object constraint topology according to the sequence of postures may be performed in combination with the first new process. In FIG. 8D, the result of performing the first and the second new process is depicted.

FIGS. 8A to 8D, which base on the same example sequence of postures, show several transitions between steps S1 to S7, in which the effectors 8 change their spatial location, but the pose of the object 3 between consecutive steps remains constant in the inertial reference frame. This is the case, for example, for the transition from step 1 to step 2 as well as for the transition from step 3 to step 4, from step 4 to step 5, and from step 6 to step 7.

If an object pose in the reference frame of an individual step does not change with respect to the immediately preceding step, a kinematic constraint of the object pose to the step's reference frame is deleted, and a new constraint to the object pose in the preceding step is generated and added. In the depicted example of FIGS. 8A to 8D, new object constraints are added from step 1 to step 2, from step 3 to step 4, from step 4 to step 5, and from step 6 to step 7. Simultaneously, kinematic constraints of the object pose to the step's reference frame are deleted in steps 2, step 4, step 5 and step 7, as shown in FIG. 8D.

FIG. 6 depicts a flowchart for a process of connecting contact constraints across the sequence of postures in an implementation of the invention. The process is an embodiment of method step S4.2 for modifying the contact topology of the sequence of postures S. The process of connecting contact constraints is performed on the sequence of postures S including postures (steps) i, i ranging from i=1, 2, . . . , n and contacts j, j ranging from j=1, 2, . . . , m.

In step S4.2.1, a step identifier is set to i=2. The method proceeds to step S4.2.2, in which a contact identifier is set to j=1.

In step S4.2.3 succeeding to step S4.2.2, the process checks whether a contact location of contact j in object coordinate frame in step i did change with respect to contact j in step i−1.

If the answer in step S4.2.3 is NO, meaning that the contact location of contact j in object coordinate frame in step i did not change with respect to contact j in step i−1, the method proceeds to step S4.2.4. In step S4.2.4, the constraint to object in step i is removed. In step S4.2.5 succeeding to step S4.2.4, the constraint of contact j in step i is connected to contact j in step i−1. The method then proceeds to step S4.2.6.

If the answer in step S4.2.3 is YES, meaning that the contact location of contact j in object coordinate frame in step i did change with respect to contact j in step i−1, the method proceeds directly to step S4.2.6.

In step S4.2.6, the contact identifier is increased by one from j to j+1. From step S4.2.6, the method proceeds to step S4.2.7. In step S4.2.7, the method determines whether all contacts of a current step i have been asserted for changes with respect to their corresponding contact location the in object coordinate frame to the contact location in the immediately preceding step i−1. In particular, step S4.2.7 determines whether the contact identifier j is equal to m.

If the answer in step S4.2.7 is NO, the method assumes there remain contacts of the current step i not been tested yet. In this case, the method returns to step S4.2.3 and repeats the steps S4.2.3, S4.2.4, S4.2.5, and S4.2.6 (inner loop) for the next contact having the increased contact identifier j+1.

If the answer in step S4.2.7 is affirmative (YES), the method assumes all contacts of the current step i having been tested and the method succeeds to step S4.2.8 and increments the step identifier i by one to i+1. The method then proceeds to step S4.2.9. In step S4.2.9, the method determines whether the all steps i of the sequence of postures have been tested with regard to change of their spatial contact location with respect to the preceding step. In particular, step S4.2.9 determines, whether step identifier i equals n+1.

If the step identifier i does not equal n+1, e.g. the answer in step S4.2.9 is NO, the method returns step S4.2.2 and sets the contact identifier to j=1. The method proceeds by checking all contacts j for the new step i.

If the step identifier i does indeed equal n+1, e.g. the answer in step S4.2.9 is YES, the method assumes that all steps i between step 2 and step n of the sequence of postures have been checked for change in contact locations of all contacts with regard to the respective preceding step and terminates the process of connecting contacts and step S4.2 of modifying the contact topology of the method.

The concept of the algorithm "connect contacts" underlying method step S4.2 to connect the constraints across the sequence can be summarized:

---
Algorithm "connect contacts"
---
For each step s_i of sequence S:
    Did contact location in object coordinate frame change with respect to the previous step s_i−1?
        No: Remove constraint to object in step s_i and connect constraint to contact point of previous step;
        Yes: Leave contact constraint as it is;
End for each.
---

The discussed example of the algorithm "connect contacts" regards a sequence of postures with an exclusively sequential structure. Alternatively or additionally, a particular example of the sequence of postures may have a structure including closed chain of postures. In a sequence of postures representing a closed chain of postures, constraints of a first posture in the sequence of postures are connected to a last posture of the sequence of postures. FIG. 7 depicts a flowchart for a process of connecting objects across the sequence of postures in an implementation of the invention. The concept of the algorithm "connect object" underlying method step S4.3 to connect the constraints across the sequence of postures can be summarized as:

---
Algorithm "connect objects":
---
For each step s_i of sequence S:
    Did object pose change with respect to the previous step s_i−1?
        No: Remove object constraint with respect to reference frame and connect object of step s_i with constraint to previous step;
        Yes: Leave object constraint as it is;
End foreach.
---

The discussed example of the algorithm "connect objects" regards a sequence of postures with an exclusively sequential structure. Alternatively or additionally, a particular example of the sequence of postures may have a structure including a closed chain of postures. In a sequence of postures representing a closed chain of postures, constraints of a first posture in the sequence of postures are connected to a last posture of the sequence of postures.

In particular, the process is an embodiment of method step S4.3 for modifying the object topology of the sequence of postures. The process of connecting contact constraints is performed on the sequence of postures S including postures (steps) i, wherein i is an integer between i=1, 2, . . . , n.

In step S4.3.1, a step identifier is initialized to i=2. The method proceeds to step S4.3.2, in which the method determines whether an object pose of the object in current step i changes with respect to the object pose of the object in the immediately preceding step i−1 of the sequence of postures.

If the answer in step S4.3.2 is NO, meaning that the contact location of contact j in object coordinate frame in step i did not change with respect to contact j in step i−1, the method proceeds to step S4.3.3. In step S4.3.3, the constraint of the object to the reference frame is removed in the current step i. The method then proceeds to step S4.3.4. In step S4.3.4, the constraint of the object in step i is connected to the object in step i−1, the immediately preceding step to the current step i in the sequence of postures. The method then proceeds to step S4.3.5.

If the answer in step S4.3.2 is YES, meaning that the object pose of the object coordinate frame in step i did indeed change with respect to the object pose of the object in the immediately preceding step i−1 of the sequence of postures, the method directly proceeds to step S4.3.5, skipping the steps 4.3.3 and S4.3.4.

In step S4.2.5, the step identifier i is incremented by one from i to i+1. The method then proceeds to step S4.3.6. In step S4.3.6, the method determines whether the all steps i of the sequence of postures have been tested with regard to change of their spatial object pose with respect to the immediately preceding step of the sequence of postures. In particular, step S4.3.6 determines, whether step identifier i equals n+1.

If the step identifier i does not equal n+1, e.g. the answer in step S4.3.6 is NO, the method proceeds with step S4.3.2. The method proceeds by checking the object pose for new step i+1.

If the step identifier i does indeed equal n+l, e.g. the answer in step S4.3.6 is YES, the method assumes that all steps i between step 2 and step n of the sequence of postures have been checked for a change in object pose with regard to the object pose in the immediately preceding step and terminates the process of connecting objects, and step S4.3 of modifying the object topology of the method.

Figure 9:
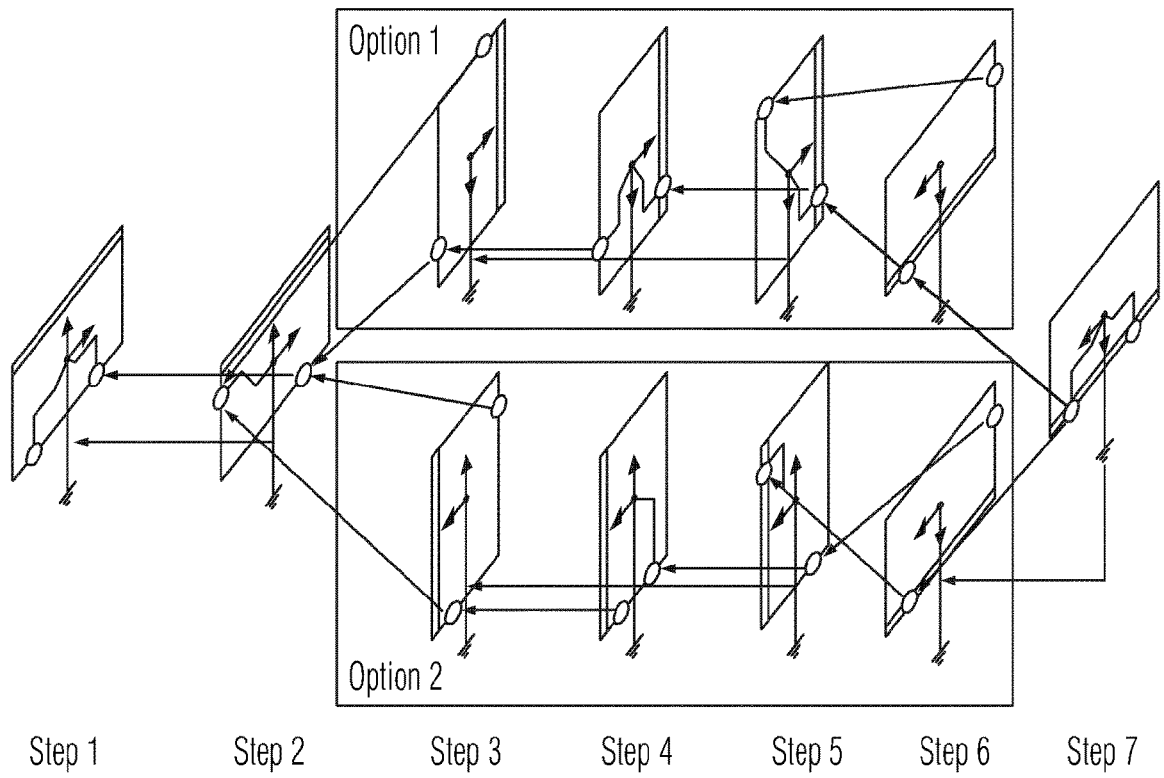
FIG. 9 illustrates a graph representation of the task comprising two alternative branches in an implementation of the invention.

FIG. 9 illustrates a graph representation of the sequence of postures addressing the task comprising two alternative branches in an implementation of the invention.

In particular, FIG. 9 depicts a graph representation of the sequence of postures with a decision point between step 2 and step 3. Extending beyond the exemplary sequence of postures shown in FIGS. 8A to 8D, which illustrate a coupling between steps in a linear sequence of postures from step 1 to step 7, the present invention extends beyond the linear sequence of postures. The same basic concept is applied to tasks that have a graph structure.

A task having a graph structure may, for example, realize addressing the task objective using two or more different options.

FIG. 9 illustrates the graph structure for a directed acyclic graph. As depicted in FIG. 9, after step 2, the task can be realized by either proceeding with rotating the object 3 clock-wise in a first option, or by rotating the object 3 counter-clockwise in an alternative second option.

The first option is displayed in the upper branch of FIG. 9. The second option is displayed in the lower branch of FIG. 9.

After step 6, both the first and the second option merge to the final step 7 again, which is the same step 7 for both options. Modelling several options permits a variety of application cases for embodiments of the invention.

For example, the pose in step 2 of the sequence of postures can be computed such that both the first option and the second option can be pursued as equally optimal.

Alternatively, the first and second options can each be weighted according to their quality.

Yet alternatively, the first and the second option may simply be selected.

FIG. 9 shows an example of a sequence of postures, which branches at the decision point of step S2 into two options. It is evident, that the concept may be extended to more than two options and to sequences of postures with more than one decision point.

In an embodiment, a user may perform the weighting of options or the selecting of options interactively via a user interface provided by a computer program.

Figure 10:
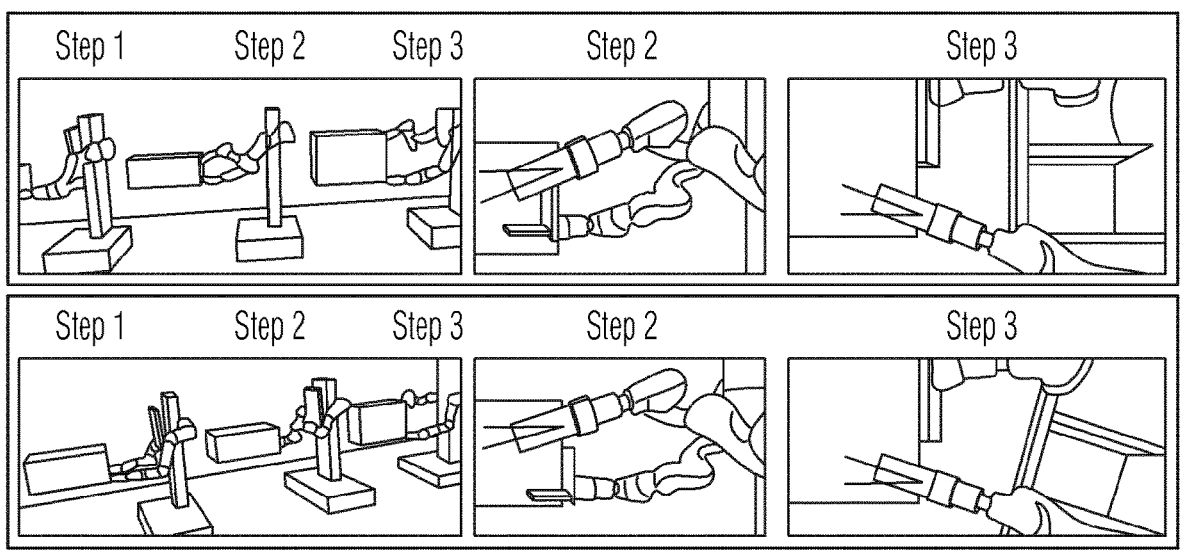
FIG. 10 illustrates a comparison for a sequence of postures before and after an optimization of the sequence of postures.

FIG. 10 illustrates a sequence of postures before and after an optimization of the sequence of postures. The task addressed in FIG. 10 is a rotating of a box-shaped object 3 by robot 2 with two effectors 8 around a horizontal axis. The step of constraint relaxation results in consistently adjusting the constraint coordinates so that the cost function H(q) will become optimal. This is illustrated in FIG. 8, which refers to the first three steps of the sequence of postures according to FIGS. 8A to 84D.

FIG. 10 shows the three steps, step 1, step 2, and step 3, of an exemplary sequence of postures. The upper portion depicts the robot postures before an optimization is performed. The upper portion corresponds to a value of the cost function H(q) that is 0.617.

The left end-effector 9 of step 2 and 3 are coupled. A rotation of the end-effector 9 about the normal vector of the box face is allowed. When performing constraint relaxation in step S5.1, the corresponding constraint is therefore removed.

The lower portion of FIG. 10 illustrates the resulting postures after performing a constraint relaxation according to step S5.1 and subsequent optimization of step S5.2. A resulting cost value of the cost function H(q) that is 0.438, which is an improvement of about 30%, when the reducing the cost value numerically corresponds to improving the solution. FIG. 8 shows the resulting angle between end-effector 9 of the robot 2 and box 3 is depicted with black lines. FIG. 8 shows that angles in step 2 and 3 are the same. For the optimized solution, the angle decreased in the lower portion of FIG. 8, but the angles in the lower portion of FIG. 8 are still consistent between step 2 and step 3 of the sequence of postures S.

Embodiments of the method may be applied in areas of robotics, for instance sequential assembly tasks and shared autonomy tasks with human guidance. More specifically, the method enables real-time robot motion planning for handling, manipulating and transporting objects. The method provides planning contacts for robot location and end-effector placement, as well as planning a sequence of object poses to achieve the given task objective. The invention also allows to find optimal solutions how a robot 2 grips a tool as specific example for a (physical) object 3.

The method enables to determine optimal motions for robot-robot cooperative tasks, such as hand-over of tools or work pieces. Therefore the method may be advantageously applied in the field of multi-robot planning.

The method is not limited to the field of robotics, but enables to perform realistic computer animation and simulation of kinematic movement of virtual characters and structural objects. The virtual characters may be animated how to perform a sequence of object manipulation steps. Creating training videos, in augmented reality/virtual reality (AR/VR-) environments, in interactive workspace design software, and in computer games is supported by the method.

The virtual characters may be employed as training examples how a human advantageously performs the task. For example, in sport and home computer games, the method supports players in identifying a sequence of postures (moves), for instance which handholds to use in a wall-climbing game, or how to set feet and hands in the twister game. In a factory setting, the sequence postures describing how to grasp and re-grasp an object 3 such as a heavy car door to be mounted onto a hinge arranged at a chassis hinge can be determined and shown to a trainee worker using AR/VR technologies. Similarly, an optimized support surface for addressing tasks that require leaning over large items while performing the task can be visualized to the trainee worker.

Changing an underlying criteria function, e.g. a load function describing a load on a human spine supports understanding which posture should be avoided, and which posture is suited when addressing the task. This can be utilized in training animations to show the difference between suitable and less suitable ways to perform the task.

The effect of applying the method for arranging elements and objects 3 in a work cell, and their immediate effect on the way a worker needs to move for addressing the task, allow designers to better learn and understand the relation of their designs to the worker's ergonomics. This can be animated directly in a computer program, or in VR/AR interface. Alternatively or additionally, computer-aided design tools may be designed that include an embodiment. The computer-aided design tool may be equipped with a slider as an input interface enabling to modify at least one parameter of a criteria function, e.g. a human ergonomic criteria function. The slider is an advantageous tool illustrating how the design of the work environment changes with respect to the chosen criteria function. Thus, the method enables human-centered motion planning in an advantageous manner. Given an ergonomic model of a human collaboration partner, the method adjusts end-effector postures and object poses in order to match a quality function that comprises an ergonomic state of the human. The robot 2 may, for instance, adjust the object pose for an ergonomically optimal hand-over to a human based on the results of the method.

In the field of human-centered motion planning, the concept of the method enables incorporating a model of a human into the algorithm. The model of the human can, for example include a bio-mechanic description, a kinematic model or an ergonomic state of the human. Starting from the given model, the method proceeds by modelling an interaction with the human using the sequential constraint concept of the method. Applying the method enables adjusting hand- and object poses of the robot 2 in order to match a quality function that comprises human-centered quantities. Particular examples include

- adjusting the object pose in a human-robot hand-over task for an ergonomically optimized hand-over to the human,
- determining how to hold the hand of a person that is to be dressed assisted by the robot 2, while pulling over a sleeve over an arm of the person, in the application area of robot-assisted dressing,
- tasks including human-robot collaborative manipulation of large objects 3, e.g. boxes, the concept enables to find a sequence of object poses that reduce loads on the spine of the human, leading to reduced lower back injuries, and
- optimizing physical support systems that aid elderly or handicapped persons to get up from a lying or sitting pose, the method may be applied to determine a spatial effector location for offering a supporting hand hold, and how to move the effector 8 so that the patient is supported optimally with respect to his or her physical abilities and ergonomic condition.

The method may be used for optimizing a location of the robot 2 based on accompanying simulations of a given task. The method may determine the optimized location from a description of the task, by simulating the steps to address the task, and performing relaxation in particular on the constraint on the location of the robot 2. Thus, the method allows to find an optimized location of the robot 2 with respect to the predefined task.

The method may be employed to simulate the given task using different types of robots 2 in order to determine, which type of robot 2 is most suited for performing the given task.

A further advantageous application area for the method is in work-place design based on one or preferably plural simulations applying the method. For example, the method is used in a computer program adapted to designing the work-place within a factory environment. Starting from a given description of the predefined task, the method may simulate the steps to address the task. In particular, the method performs relaxation of the constraint on the location of the tools and physical objects 3 related to the task according to the description. Applying the method results in determining optimized locations of the required tools and objects 3 required for the performing the predefined task.

The method may be advantageously applied for finding optimal motions for perturbations in a task. The method determines optimized solutions for problems, in which exact coordinates of end-effectors 9 and objects 3 involved in the task are unknown, or the coordinates vary to certain degree. The method addresses this particular problem by adding perturbations of the task as additional sequences of postures S to the overall model of the task, and to optimize the overall perturbations as one ensemble. A particular example is the "grip-in-the-box"-problem, in which a robot 2 is required to grasp objects 3 from different locations out of a box.

The method enables a predictive decision making in a particular advantageous manner. A sequence of postures is extended to a graph of postures or a tree-like structure. Each branch of a tree represents an alternate option for proceeding from a decision point. The tree separates at the decision point into separate branches, wherein each branch corresponds to one of a number of alternate options. When manipulating an object, an example of the decision point may include two alternatives in proceeding, either in a first option "turning the object left" or in a second option "turning the object right" when proceeding with the sequence of postures. The method allows without any extension modelling such tree topologies, which makes the method unique and advantageous with respect to known trajectory optimization algorithms. Potential applications include applying the method in online receding horizon motion planning. In online receding horizon motion planning as a particular example, a motion can be computed such that it is optimized with respect to the first option or the second option, or a weighted average of all possible options at a same time. Thus, decision making between a first option and a second option may be based on computed criteria.

The discussion used an example characterized by a sequence of postures with linear structure. However, extending the concept of a linear sequence to the graph of postures according to the invention, for instance a tree structure including two or more branches provides further advantages. The cost function corresponding to each branch may be weighted so that a contribution of the cost function of each individual branch to the overall cost function can be modulated. Weighting both options in a tree structure with two branches equally will result in a sequence of postures that is optimized with respect to both options. This results in determining motions that allow to take a decision for one of the two branches, therefore for one out of the two options, as late as possible.

Provided that some measure describing which one of the alternate options is more likely is known, the options may be weighted according to their respective likelihood. If, for instance, in known cases, a left effector of the robot has been preferred over a right effector of the robot for grasping an object with a ratio of 80% to 20%, the known ratio may be used to modulate both options accordingly.

Using the same model, the sequence of postures may be computed using the first option only, and then second option only. Subsequently, the computed results may be compared, and a decision for one of the first and the second option can be taken based on a comparison of the cost functions for both options.

In case there exists a large number of possible alternate options, a weighting of the alternate options can be included into an optimization problem, providing solutions that are void of the options with the least quality, and maintain the options which are most promising.

The method may be applied in in-hand manipulation of objects 3. Given an initial contact sequence in the initial sequence of postures, the method enables determining optimized contact sequences for an in-hand object manipulation task.

The method is applicable to tasks such as object transportation or object manipulation with an unknown number of re-grasps by the end-effectors 9. In case the number of re-grasps or contact changes is unknown, the method may be applied to compute several sequences of postures, each sequence with a different number of postures (steps), and to determine the minimum number of postures by rejecting all computed sequences that deliver motions leading to a violation of at least one physical limit of the robot 2.

In the area of multi-contact locomotion of a mobile robot 2, the method may be applied to optimize multi-limb locomotion patterns for a humanoid or multi-legged robot 2.

The method of present invention enables to control the robot 2, in particular at least one effector trajectory of at least one effector 8 of the robot 2. Controlling the effector trajectory has effects (physical effects) in the real world, for example in changes of spatial coordinates of the at least one effector 8 and therefore movement of the at least one effector 8 in the real world, which can be expressed in physical parameters. The robustness of robot control may be improved, a power consumption of the robot 2 may be reduced and the robot 2 operates more efficient. The computational effort for computing the at least one effector trajectory is advantageously reduced when applying the method. The method is advantageously fast and therefore well suited for online and real-time application, and thus in a robotic system 1 controlled according to the principle of receding horizon control.

What is claimed is:

1. A method for controlling at least one effector trajectory for a robot for solving a predefined task, the method comprising:
    acquiring a graph of postures, wherein each posture includes at least one contact point and a kinematic pose of the at least one effector, and at least one first posture and at least one second posture of the graph of postures are alternate postures;
    modifying at least one of a contact constraint topology and an object constraint topology according to the acquired graph of postures,
        wherein modifying the contact constraint topology comprises:
            in case a contact location in an object frame of a current posture in the graph of postures remains the same as a contact location of the corresponding contact in an immediately preceding posture of the graph of postures;
            removing a constraint of the contact to the object in the current posture; and
            connecting a new constraint of the contact in the current posture to the corresponding contact in at least one immediately preceding posture of the sequence of postures; and
        wherein modifying the object constraint topology comprises:
            in case an object pose of the current posture in the graph of postures remains the same as the object pose in an immediately preceding posture of the graph of postures;
            removing a constraint of the object in the current posture, and
            connecting a new constraint of the object in the current posture to the corresponding object in at least one immediately preceding posture of the graph of postures;
    generating a set of constraint equations based on at least one of the modified contact constraint topology and the modified object constraint topology;
    performing constraint relaxation to generate a set of relaxed constraint equations to generate a task description including the set of relaxed constraint equations;
    generating the at least one effector trajectory by applying a trajectory generation algorithm on the generated task description;
    performing an inverse kinematics algorithm on the generated at least one effector trajectory for generating a control signal; and
    controlling the at least one effector of the robot to execute the at least one effector trajectory based on the generated control signal.

2. The method for controlling at least one effector trajectory according to claim 1, wherein performing constraint relaxation to generate the set of relaxed constraint equations comprises at least one of:
    regularizing at least one constraint by allowing a deviation from an individual constraint;
    removing at least one constraint which is invariant for performing the task; and
    removing at least one constraint in case a value of a constraint coordinate is within a predetermined interval.

3. The method for controlling at least one effector trajectory according to claim 1, wherein
    the method for controlling the at least on effector trajectory controls the effector in real-time.

4. The method for controlling at least one effector trajectory according to claim 1, wherein
    the method is executed as part of an online receding horizon planning method.

5. The method for controlling at least one effector trajectory according to claim 1, wherein generating the at least one effector trajectory by applying a trajectory generation algorithm on the generated task description comprises:
    applying weights to a cost function for the at least one first posture and the at least one second posture.

6. The method for controlling at least one effector trajectory according to claim 5, wherein
    a first weight is applied to the cost function for the at least one first posture and at least one second weight is applied to the at least one second posture.

7. The method for controlling at least one effector trajectory according to claim 6, wherein
    the first weight and at least one second weight have a same value.

8. The method for controlling at least one effector trajectory according to claim 6, wherein the method further comprises:
    determining the first weight and the at least one second weight and computes the first weight and at least one second weight to have a different value.

9. The method for controlling at least one effector trajectory according to claim 6, wherein the method further comprises:
    determining the first weight and the at least one second weight according to a measure of likelihood whether selecting the first posture or the at least one second posture.

10. The method for controlling at least one effector trajectory according to claim 6, wherein
    the acquired graph of postures, includes for the at least one first posture a plurality of second postures of the graph of postures as alternate postures; and
    the method comprises determining the first weight and a plurality of second weights for the plurality of second postures in an optimization process; and discarding at least one of the first posture and the second postures with a least quality.

11. A non-transitory computer-readable storage medium embodying a program of machine-readable instructions executable by a digital processing apparatus to cause the digital processing apparatus to perform the method according to claim 1.

12. A robotic system for controlling at least one effector trajectory of at least one effector of a robot for solving a predefined task, the robotic system comprising a computer including at least one processor, a memory, and the robot, wherein:
    the robotic system is configured to acquire a graph of postures, wherein each posture includes at least one contact point and a kinematic pose of the at least one effector, and at least one first posture and at least one second posture of the graph of postures are alternate postures;

the at least one processor is configured to:
  modify at least one of a contact constraint topology and an object constraint topology according to the acquired graph of postures,
    wherein modifying the contact constraint topology comprises:
      in case a contact location in an object frame of a current posture in the graph of postures remains the same as a contact location of the corresponding contact in an immediately preceding posture of the graph of postures;
      to remove a constraint of the contact to the object in the current posture; and
      to connect a new constraint of the contact in the current posture to the corresponding contact in at least one immediately preceding posture of the sequence of postures; and
    wherein modifying the object constraint topology comprises:
      in case an object pose of the current posture in the graph of postures remains the same as the object pose in an immediately preceding posture of the graph of postures;
      to remove a constraint of the object in the current posture; and
      to connect a new constraint of the object in the current posture to the corresponding object in at least one immediately preceding posture of the graph of postures;
  generate a set of constraint equations based on at least one of the modified contact constraint topology and the modified object constraint topology;
  perform constraint relaxation to generate a set of relaxed constraint equations to generate a task description including the relaxed set of constraint equations;
  generate at least one effector trajectory by applying a trajectory generation algorithm on the generated task description;
  perform an inverse kinematics algorithm on the generated at least one effector trajectory for generating a control signal for controlling the at least one effector; and
  output the control signal to the robot, and
wherein the robot is configured to control the at least one effector based on the control signal.

13. A method for controlling at least one effector trajectory for a robot for solving a predefined task, the method comprising:
  acquiring a graph of postures, wherein each posture includes at least one contact point and a kinematic pose of the at least one effector, and at least one first posture and at least one second posture of the graph of postures are alternate postures;
  modifying at least one of a contact constraint topology and an object constraint topology according to the acquired graph of postures;
  generating a set of constraint equations based on at least one of the modified contact constraint topology and the modified object constraint topology;
  performing constraint relaxation to generate a set of relaxed constraint equations to generate a task description including the set of relaxed constraint equations;
  generating the at least one effector trajectory by applying a trajectory generation algorithm on the generated task description,
    wherein generating the at least one effector trajectory comprises:
      generating at least one first effector trajectory by applying a trajectory generation algorithm on the generated task description including the relaxed set of constraint equations including the at least one first posture;
      generating at least one second effector trajectory by applying a trajectory generation algorithm on the generated task description including the relaxed set of constraint equations including the at least one second posture separately;
      comparing a first cost function of the generated at least one first effector trajectory and a second cost function of the generated at least one second effector trajectory; and
      selecting either the at least one first effector trajectory or the a at least one second effector trajectory based on the comparison of the first cost function and the second cost function;
  performing an inverse kinematics algorithm on the generated at least one effector trajectory for generating a control signal; and
  controlling the at least one effector of the robot to execute the at least one effector trajectory based on the generated control signal.

14. A robotic system for controlling at least one effector trajectory of at least one effector of a robot for solving a predefined task, the robotic system comprising a computer including at least one processor, a memory, and the robot, wherein:
  the robotic system is configured to acquire a graph of postures, wherein each posture includes at least one contact point and a kinematic pose of the at least one effector, and at least one first posture and at least one second posture of the graph of postures are alternate postures;
  the at least one processor is configured to:
    modify at least one of a contact constraint topology and an object constraint topology according to the acquired graph of postures;
    generate a set of constraint equations based on at least one of the modified contact constraint topology and the modified object constraint topology;
    perform constraint relaxation to generate a set of relaxed constraint equations to generate a task description including the relaxed set of constraint equations;
    generate at least one effector trajectory by applying a trajectory generation algorithm on the generated task description,
      wherein generating the at least one effector trajectory comprises:
        to generate at least one first effector trajectory by applying a trajectory generation algorithm on the generated task description including the relaxed set of constraint equations including the at least one first posture;
        to generate at least one second effector trajectory by applying a trajectory generation algorithm on the generated task description including the relaxed set of constraint equations including the at least one second posture separately;
        to compare a first cost function of the generated at least one first effector trajectory and a second cost function of the generated at least one second effector trajectory; and to select either the at least one first effector trajectory or the a at least one second effector trajectory based on the comparison of the first cost function and the second cost function;
perform an inverse kinematics algorithm on the generated at least one effector trajectory for generating a control signal for controlling the at least one effector; and
output the control signal to the robot, and
wherein the robot is configured to control the at least one effector based on the control signal.

* * * * *